(12) United States Patent
Ren et al.

(10) Patent No.: US 12,129,885 B2
(45) Date of Patent: Oct. 29, 2024

(54) SURFACE FASTENER

(71) Applicant: YKK Corporation, Tokyo (JP)

(72) Inventors: Zhiyu Ren, Kurobe (JP); Atsushi Nakaya, Kurobe (JP); Yuta Inoue, Kurobe (JP)

(73) Assignee: YKK Corporation, Tokyo (JP)

( * ) Notice: Subject to any disclaimer, the term of this patent is extended or adjusted under 35 U.S.C. 154(b) by 224 days.

(21) Appl. No.: 17/636,262

(22) PCT Filed: Feb. 18, 2020

(86) PCT No.: PCT/JP2020/006338
§ 371 (c)(1),
(2) Date: Feb. 17, 2022

(87) PCT Pub. No.: WO2021/038917
PCT Pub. Date: Mar. 4, 2021

(65) Prior Publication Data
US 2022/0290706 A1    Sep. 15, 2022

(30) Foreign Application Priority Data

Aug. 30, 2019   (WO) ................. PCT/JP2019/034183
Dec. 20, 2019   (JP) ................................ 2019-230845

(51) Int. Cl.
*A44B 18/00*    (2006.01)
*F16B 5/07*     (2006.01)

(52) U.S. Cl.
CPC ............ *F16B 5/07* (2013.01); *A44B 18/0003* (2013.01); *Y10T 24/27* (2015.01)

(58) Field of Classification Search
CPC ........ Y10T 24/27; A44B 18/0076; F16B 5/07
See application file for complete search history.

(56) References Cited

U.S. PATENT DOCUMENTS 5,422,156 A    6/1995   Billarant
5,786,061 A    7/1998   Banfield
(Continued)

FOREIGN PATENT DOCUMENTS

JP    H09-506559 A    6/1997
JP    2002-540872 A   12/2002
(Continued)

OTHER PUBLICATIONS

English Translation of the Written Opinion of the International Searching Authority mailed May 19, 2020 for PCT/JP2020/006338 as retrieved from patentscope.com. (Year: 2024).*

(Continued)

*Primary Examiner* — Robert Sandy
*Assistant Examiner* — Michael S Lee
(74) *Attorney, Agent, or Firm* — Kilpatrick Townsend & Stockton LLP

(57) ABSTRACT

The surface fastener includes a base portion, a fastener member that includes a plurality of engagement elements, and a masking member that is detachably held by the fastener member. The masking member covers an engaging area of the fastener member, at least a part of the engaging element is embedded in the masking member. A space portion is provided between the base portion and the masking member in the engaging area. Thus, a foam resin can be prevented from intruding the engaging area of the fastener member in foam-molding of the cushion body. The masking member is also easily peeled off from the fastener member after foam-molding.

15 Claims, 15 Drawing Sheets

(56) References Cited

U.S. PATENT DOCUMENTS

| | | | |
|---|---|---|---|
| 6,303,062 B1 | 10/2001 | Aamodt et al. | |
| 6,656,563 B1 | 12/2003 | Leach et al. | |
| 9,936,773 B2 | 4/2018 | Okuda et al. | |
| 2010/0139004 A1* | 6/2010 | Cheng | B32B 27/40 |
| | | | 5/655.9 |
| 2010/0162535 A1 | 7/2010 | Cheng | |
| 2011/0197404 A1 | 8/2011 | Terada et al. | |
| 2012/0011685 A1 | 1/2012 | Rocha | |
| 2014/0298628 A1 | 10/2014 | Minato et al. | |
| 2017/0295890 A1 | 10/2017 | Imai et al. | |
| 2022/0290706 A1 | 9/2022 | Ren et al. | |

FOREIGN PATENT DOCUMENTS

| | | |
|---|---|---|
| JP | 2010-131353 A | 6/2010 |
| JP | 2013-530796 A | 8/2013 |
| WO | 1995/01741 A1 | 1/1995 |
| WO | 2010/052779 A1 | 5/2010 |
| WO | 2010/146667 A1 | 12/2010 |
| WO | 2013/061423 A1 | 5/2013 |

OTHER PUBLICATIONS

Office Action, Japanese Patent Application No. 2021-541978, Oct. 18, 2022, 12 pages.
Office Action, Japanese Patent Application No. 2021-542606, Oct. 18, 2022, 10 pages.
International Search Report, PCT Patent Application No. PCT/JP2020/006338, May 19, 2020.
European Extended Search Report, European Patent Application No. 20857912.8, Oct. 10, 2022, 7 pages.
U.S. Appl. No. 17/634,204, Non-Final Office Action, Jun. 26, 2023, 9 pages.
European Extended Search Report, European Patent Application No. 20859222.0, Sep. 29, 2022, 10 pages.
International Search Report and Written Opinion, PCT Patent Application No. PCT/JP2020/027098, Oct. 13, 2020, 5 pages.
Decision of Rejection, Japanese Patent Application No. 2021-541978, Feb. 7, 2023, 10 pages.

* cited by examiner

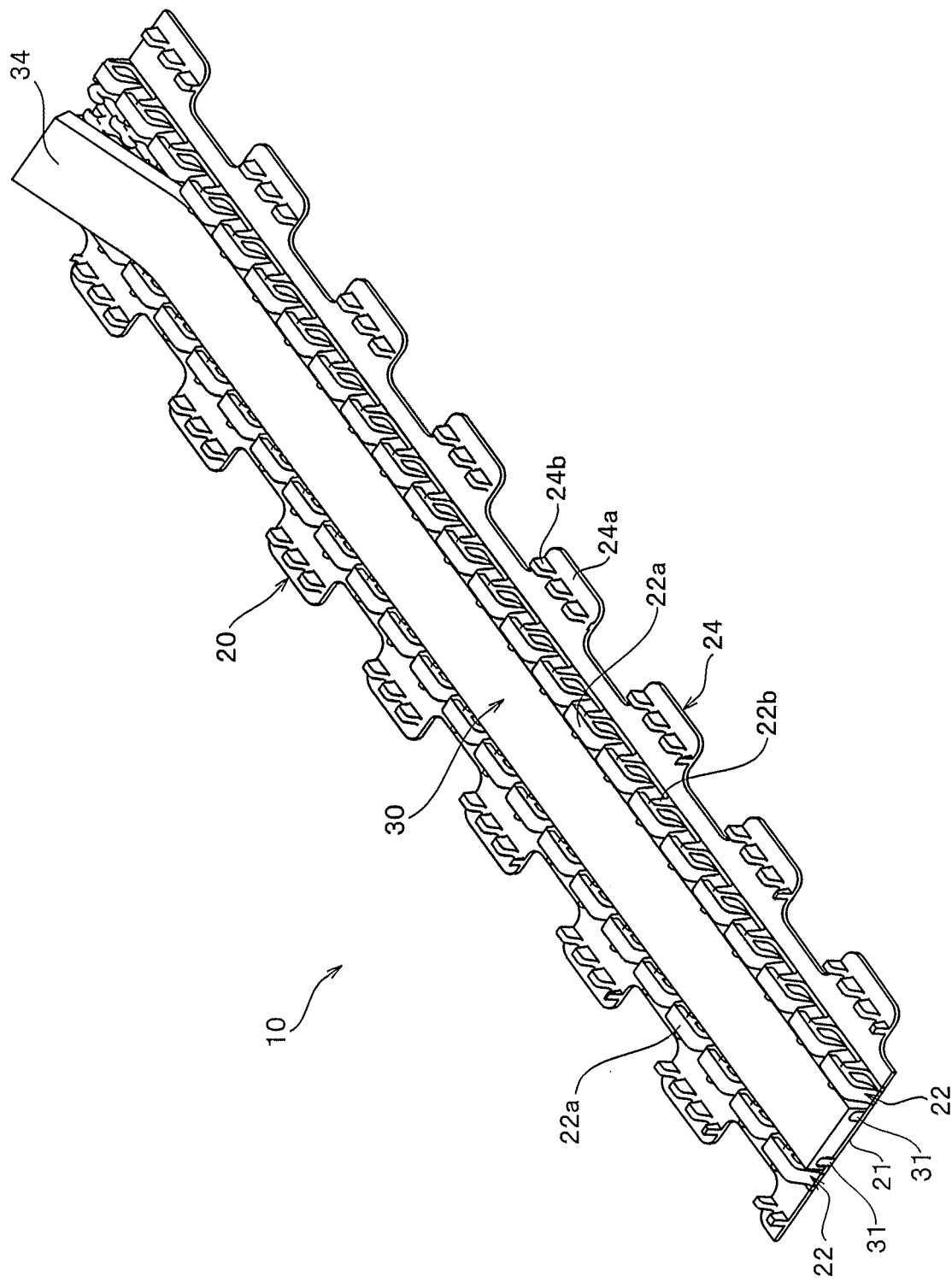

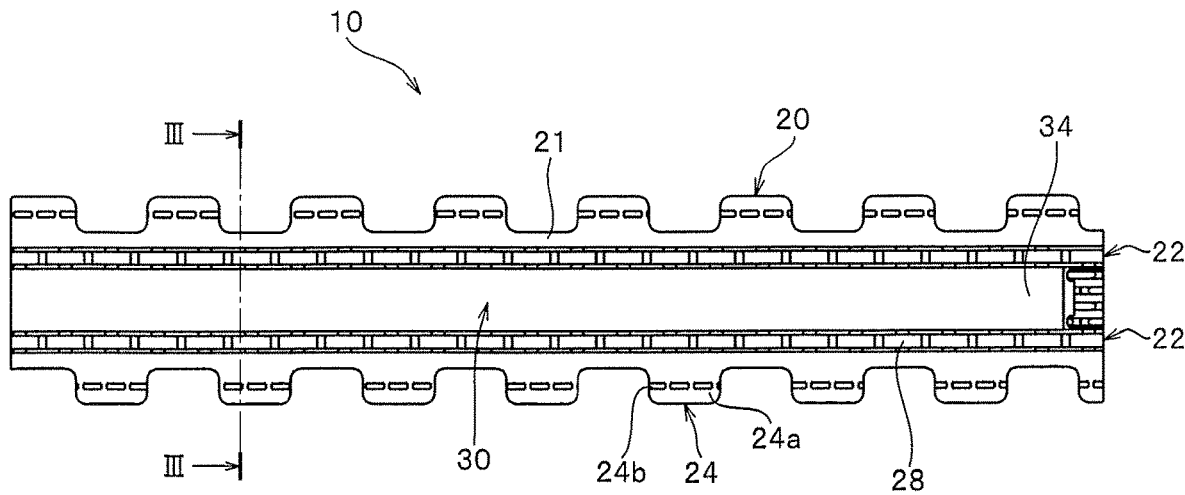
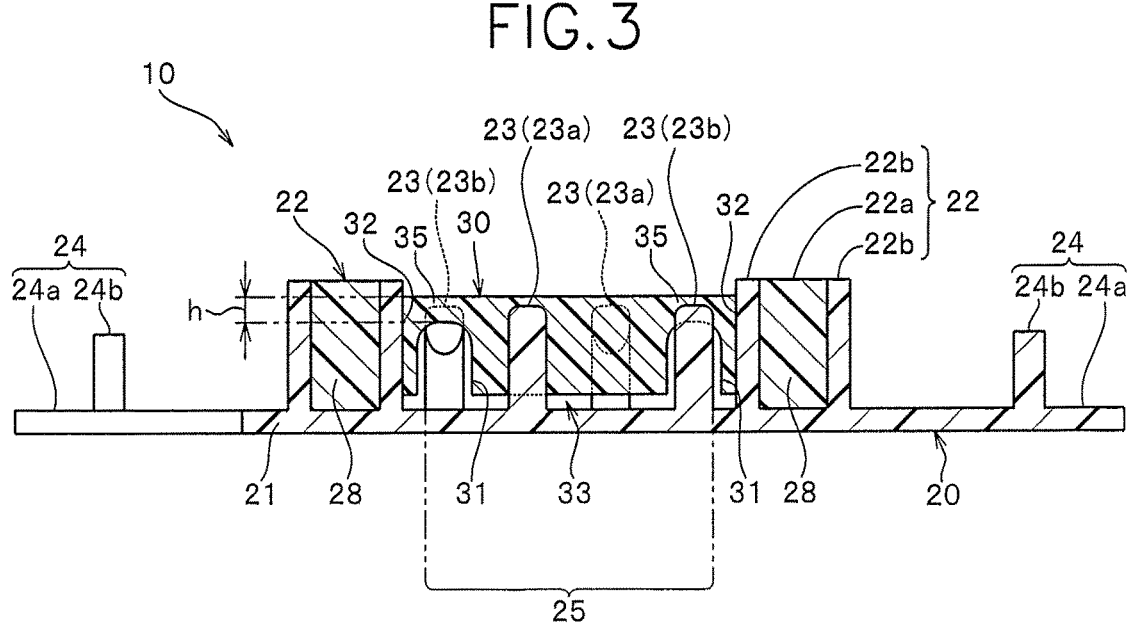

SURFACE FASTENER

TECHNICAL FIELD

The invention relates to a surface fastener that has a fastener member made of a synthetic resin and a masking member made of a synthetic resin and detachably held by the fastener member, and relates to a method for manufacturing the surface fastener.

BACKGROUND ART

Seats for automobiles and trains, various sofas, office chairs, and the like, are sometimes formed by covered and secured the surface of a cushion body (a foam body), which is molded into a predetermined shape using a foam resin, with a covering member made of a woven fiber fabric or a natural or synthetic leather, or the like. Additionally, when the surface of the cushion body is covered and secured by the covering member after the cushion body has been molded into the desired shape, a combination of male surface fasteners (an engaging head member) with a plurality of hook-shaped engaging elements and female surface fasteners (a loop member) with a plurality of loops are used as a means of securing the surface of the cushion body to the back surface of the covering member. A male surface fastener obtained by molding a thermoplastic resin is also sometimes called a molded surface fastener.

When manufacturing the cushion body of which such molded surface fastener integrally attached to the surface, the molded surface fastener is first set at a predetermined position of a die, and then foam-molding of the cushion body is performed in the die with the molded surface fastener set in place. It is thus possible to manufacture the cushion body to which the molded surface fastener is secured in a state of exposing the engaging elements of the molded surface fastener.

In manufacturing such cushion body with the molded surface fastener, for example, in foam-molding of the cushion body, if the foam resin intrudes into a region (an engaging area) in which the engaging elements of the molded surface fastener are arranged, and the foam body is formed around the engaging elements, those engaging elements become difficult or impossible to engage to the loops of the loop member. As a result, engaging strength (strength against peeling off) of the molded surface fastener to the loop member reduces. For this reason, various techniques have been conventionally developed to prevent the foam resin from intruding into the engaging area of the molded surface fastener.

For example, JPH09-506559A (Patent Document 1) discloses a surface fastener 100 shown in FIG. 23. This surface fastener 100 of the Patent Document 1 has a fastener member 101 made of a synthetic resin and an elastomer surrounding portion 102. The fastener member 101 has a base portion 103 and hook-shaped engaging elements (hook elements) 104. The base portion 103 supports a plurality of the engaging elements 104.

The elastomer surrounding portion 102 is formed so that it can be peeled off from the fastener member 101, as well as it completely enwraps the engaging elements 104 of the fastener member 101. This elastomer surrounding portion 102 is formed by coating a surface of the fastener member 101 on which the engaging elements 104 is formed with a liquid composition, and then drying the coated liquid composition in an oven.

According to the surface fastener 100 in the Patent Document 1 shown in FIG. 23, the engaging elements 104 of the fastener member 101 are completely enwrapped by the elastomer surrounding portion 102. This enables the elastomer surrounding portion 102 to prevent the foam resin from intruding between the engaging elements 104 of the surface fastener 100 in foam-molding of the cushion body in a die with the surface fastener 100 set in place. Thus, after foam-molding of the cushion body, it is possible to expose a plurality of the engaging elements 104, which are uncontaminated by the foam resin, by peeling off the elastomer surrounding portion 102 from the fastener member 101. This enables a loop member to stably engage to the molded surface fastener 100.

Additionally, a surface fastener 110 shown in FIG. 24 is disclosed in JP2010-131353A (Patent Document 2). The surface fastener 110 of Patent Document 2 has a first tape body 111, a second tape body 112 that is secured to a lower surface of the first tape body 111, left and right first protection layers 113 provided on upper surfaces of left and right side edges of the first tape body 111, and second protection layer 114 that is attached to the left and right first protection layers 113.

A plurality of engaging elements (hook bodies) 115 protrude on an upper surface of the first tape body 111.

The second tape body 112 is formed by a material such as non-woven fabric, and reinforces the strength of the first tape body 111. The first protection layer 113 is integrally formed on the first tape body 111 with the engaging elements 115 of the first tape body 111 embedded in the protection layer 113, so that the protection layer 113 is not peeled off from the first tape body 111.

This first protection layer 113 is formed by polyurethane, and contains magnetic materials. The second protection layer 114 covers the engaging elements 115 of the first tape body 111 from above as well as is attached to an upper surface of the first protection layer 113. This second protection layer 114 is made of flexible material such as paper. Magnetic materials are also contained in the second protection layer 114.

According to the surface fastener 110 of the Patent Document 2 shown in FIG. 24, the engaging elements 115 arranged between the left and right first protection layers 113 are covered with the first protection layer 113 and second protection layer 114. Thus, in foam-molding of the cushion body in a die with the surface fastener 110 set in place, it is possible to prevent the foam resin from intruding beyond the first protection layer 113 and the second protection layer 114.

PRIOR ART DOCUMENTS

Patent Documents

Patent Document 1: JPH09-506559A
Patent Document 2: JP2010-131353A

SUMMARY OF INVENTION

Problems to be Solved by the Invention

According to the surface fastener 100 of the Patent Document 1 shown in FIG. 23, a plurality of the engaging elements 104 arranged on the fastener member 101 are completely embedded in the elastomer surrounding portion 102. For this reason, in peeling off the elastomer surrounding portion 102 from the fastener member 101 after foam-molding of the cushion body, it is sometimes difficult to peel off the elastomer surrounding portion 102 from the fastener member 101. Additionally, in peeling off the elastomer surrounding portion 102 from the fastener member 101, it may cause the engaging element 104 to be deformed or damaged by the elastomer surrounding portion 102 being strongly pulled.

Whereas, according to the surface fastener 110 of the Patent Document 2 shown in FIG. 24, there are possibilities that the second protection layer 114 may be partially peeled off from the first protection layer 113, or a gap may occur between the first protection layer 113 and the second protection layer 114 in foam-molding of the cushion body. As a result, there is a risk in which the foam resin may intrude the engaging area from a part at which the second protection layer 114 is peeled off, or from the gap between the first protection layer 113 and the second protection layer 114.

The present invention is developed in consideration of the above problems. The objective of the present invention is providing a surface fastener capable of preventing the foam resin from intruding into an engaging area in foam-molding of the cushion body by covering the engaging area formed by a plurality of the engaging element with a masking member, and capable of peeling off easily the masking member after foam-molding of the cushion body, and a method for manufacturing the surface fastener.

Means for Solving the Problems

To achieve the above objective, a surface fastener provided by the present invention including:

a fastener member made of a synthetic resin and a masking member detachably held by the fastener member, wherein the fastener member includes an elongated and plate-shaped base portion having a first surface and a second surface, and a plurality of engaging elements protruding from the first surface of the base portion, the masking member covers an engaging area, in which a plurality of the engaging elements of the fastener member are included, from the opposite side of the base portion, at least a part of at least one of the engaging elements is embedded in the masking member, and a space portion is provided between the base portion and the masking member at at least a part of the engaging area.

In the surface fastener of the present invention, it is preferable that the masking member is away from the base portion via the space portion in the whole of the engaging area.

It is also preferable that the fastener member includes a plurality of engaging element rows in which a plurality of the engaging elements are formed along the length direction of the base portion in each engaging element row, and a plurality of the engaging elements disposed in one engaging element row are embedded in the masking member at the same depth.

Additionally, it is preferable that the masking member is long, and a cross-section of the masking member or a body portion of the masking member perpendicular to the length direction has the same shape in the whole of the masking member in the length direction.

In the surface fastener of the present invention, it is preferable that the masking member includes a masking back surface facing the base portion and a masking top surface disposed on the opposite side of the masking back surface, the masking member includes a thin portion, and the height dimension of the thin portion from the masking back surface to the masking top surface is smaller than the height dimension of the engaging element from the first surface of the base portion.

It is also preferable that the masking member includes a masking back surface facing the base portion and a masking top surface disposed on the opposite side of the masking back surface, and the masking member includes a recessed channel portion provided on the masking back surface and extending in a direction away from the first surface of the base portion.

Furthermore, it is preferable that the engaging element includes a standing portion that stands up from the base portion and an engaging head portion extending from a tip end portion of the standing portion, a plurality of the engaging elements comprised in the engaging area include an anchoring engaging element, at least a part of the engaging head portion of which is embedded in the masking member, and a peeling engaging element, which is embedded in the masking member at smaller depth than the anchoring engaging element or which is not embedded in the masking member.

In this case, it is more preferable that the whole engaging head portion and at least a part of the standing portion of the anchoring engaging element are embedded in the masking member.

In the surface fastener of the present invention, it is preferable that a plurality of the engaging elements comprised in the engaging area are embedded in the masking member at a constant depth.

It is also preferable that the fastener member includes left and right vertical wall portions provided upright along the length direction on the base portion, a plurality of the engagement elements and the masking member are arranged between the left and right vertical wall portions, monofilaments containing magnetic particles are fixed on the left and right vertical wall portions, or magnetic particles are contained in the left and right vertical wall portions.

In this case, it is more preferable that the masking member includes a masking back surface facing the base portion and a masking top surface disposed on the opposite side of the masking back surface, top end surfaces of the left and right vertical wall portions are located farther away from the base portion than the masking top surface of the masking member in the height direction of the surface fastener.

In the present invention, the monofilament containing magnetic particles may be arranged or magnetic particles may be contained in the masking member along the length direction of the masking member.

In the present invention, it is preferable that the surface fastener includes a plurality of fastener engaging portions disposed along the length direction and a flexible connecting portion that connects the fastener engaging portions adjacent to each other in the length direction, the connecting portion is formed by the fastener member and the masking member.

It is also preferable that the fastener member includes a rib protruding from the first surface of the base portion and fills the space portion.

Furthermore, in the surface fastener of the present invention, it is preferable that a bending portion formed by bending the masking member in a direction away from the base portion is provided at at least one of the both end portions of the masking member in the length direction.

It is also preferable that a slit that separates a part of the base portion is provided at at least one of the both end portions of the base portion in the length direction.

Next, a method for manufacturing a surface fastener according to the present invention is the method for manufacturing a surface fastener including a fastener member made of a synthetic resin and a masking member made of a synthetic resin and detachably held by the fastener member, the method including:

supplying a molten synthetic resin for fastener from a first nozzle portion of a first molding apparatus to mold
the fastener member that includes an elongated and plate-shaped base portion having a first surface and a second surface, and a plurality of engaging elements protruding from the first surface of the base portion;

supplying a molten synthetic resin for masking or an elastomer for masking from a second nozzle portion of a second molding apparatus;

attaching the synthetic resin for masking or the elastomer for masking before curing to the molded fastener member; and embedding a part of the engaging elements of the fastener member in the synthetic resin for masking or the elastomer for masking and providing a space portion between the base portion of the fastener member and the synthetic resin for masking or the elastomer for masking, when attaching the synthetic resin for masking or the elastomer for masking to the fastener member.

Such method for manufacturing the surface fastener of the present invention preferably includes:

giving the synthetic resin for masking or the elastomer for masking a shape capable of forming a masking back surface of the masking member, using a molding roller disposed in the second molding apparatus, before attaching the synthetic resin for masking or the elastomer for masking to the fastener member.

Effects of Invention

According to the present invention, it is possible to provide a surface fastener in which the foam resin is prevented from intruding into an engaging area in foam-molding of the cushion body and a masking member is easily peeled off after foam-molding, and to provide a method for manufacturing the surface fastener.

BRIEF DESCRIPTION OF DRAWINGS

FIG. 1 is a perspective view schematically showing a surface fastener according to an Embodiment 1 of the present invention.

FIG. 2 is a plan view of the surface fastener shown in FIG. 1.

FIG. 3 is a cross-sectional view in line shown in FIG. 2.

DESCRIPTION OF EMBODIMENTS

Hereinafter, preferred embodiments of the present invention are described in detail with Embodiments referring to drawings. Note that, the present invention is not limited to Embodiments described hereinafter, various modifications can be made if they have structures and functional effects substantially identical to the present invention. For example, in the present invention, a length dimension and width dimension of a molded surface fastener, and the number, a location of arrangement and forming density of the engaging elements provided on the molded surface fastener are not particularly limited, and can be changed freely.

Embodiment 1

Figure 4:
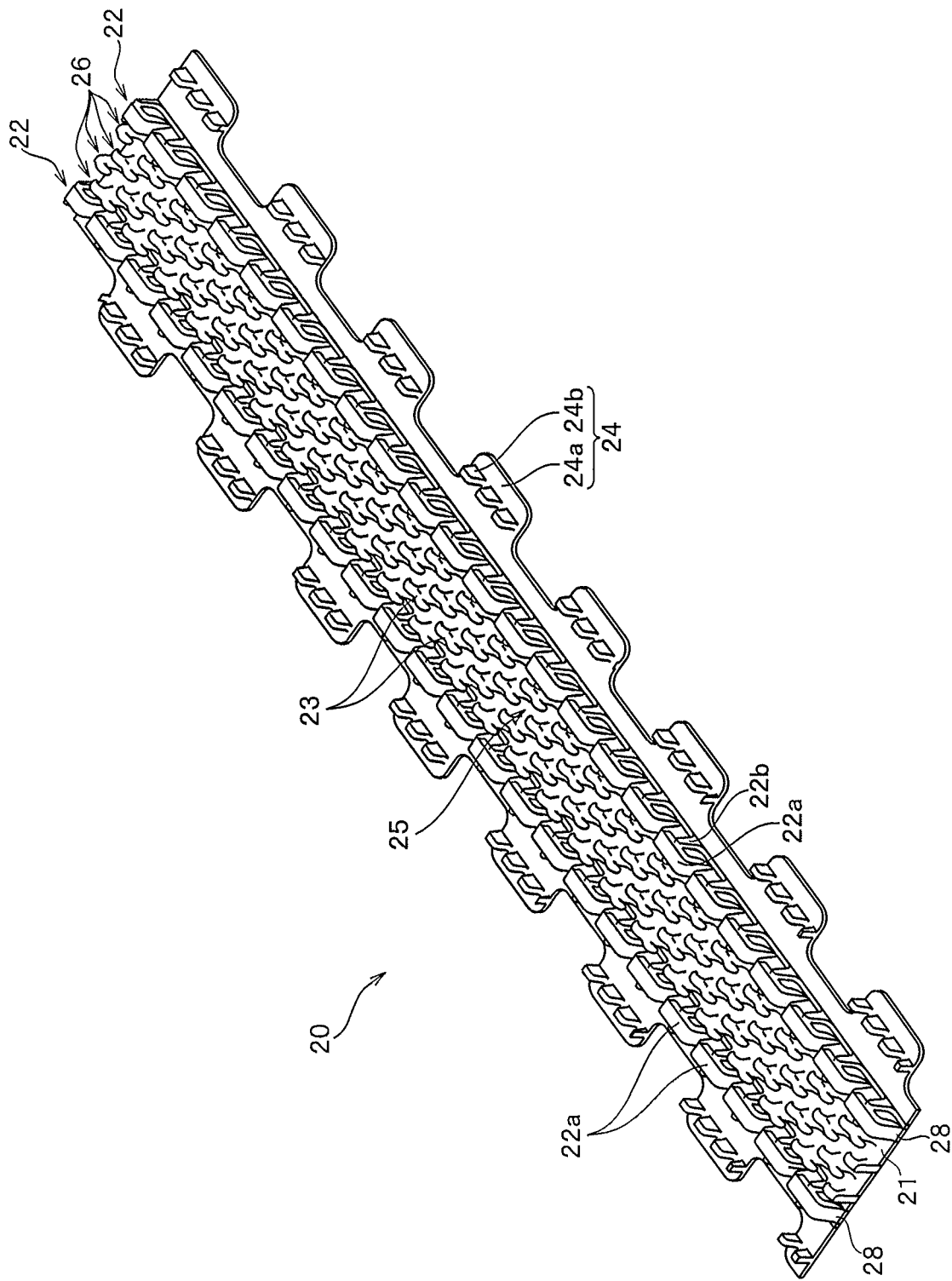
FIG. 4 is a perspective view schematically showing a fastener member of the surface fastener shown in FIG. 1.

FIG. 1 is a perspective view schematically showing a surface fastener according to the Embodiment 1. FIG. 2 is a plan view of the surface fastener, and FIG. 3 is a cross-sectional view in line shown in FIG. 2. FIG. 4 is perspective view schematically showing a fastener member forming the surface fastener.

In the following descriptions, a front and rear direction regarding the surface fastener refers to a length direction or longitudinal direction of the fastener member that is molded long, and this front and rear direction refers to, for example, a direction along a machine direction (MD) in which the surface fastener is continuously molded in a manufacturing process of the surface fastener.

A left and right direction refers to a width direction perpendicular to the front and rear direction, and along an upper surface of a base portion of the fastener member. In this case, the left and right direction and the width direction can also be said as a crossing direction (CD) perpendicular to the machine direction (MD). An upper and lower direction refers to a height direction or thickness direction perpendicular to the upper surface of the base portion of the fastener member. In particular, a direction in which engaging elements protrude with respect to the base portion is upward, and the opposite direction is downward.

A surface fastener 10 according to the Embodiment 1 includes a fastener member 20 made of a synthetic resin that is formed long in the front and rear direction, and a masking member 30 that is detachably held by an upper surface (a first surface) of the fastener member 20.

The fastener member 20 includes a thin plate-shaped base portion 21, left and right vertical wall portions 22 extending upward from left and right side edge portions of the base portion 21, a plurality of hook-shaped engagement elements 23, extending upward from the base portion 21 as well as being arranged between the left and right vertical wall portions 22, and a plurality of ear portions 24 extending outside from the base portion 21 in the left and right direction. Additionally, an engaging area 25 formed by a plurality of the engagement elements 23 is provided between the left and right vertical wall portions 22 of the fastener member 20. Loops of a loop member (not shown) are engaged with this engaging area 25.

The fastener member 20 is, as described later, formed by melting a synthetic resin for fastener substantially not containing magnetic particles to mold a predetermined shape, and supplying monofilaments 28 containing magnetic particles to a molten synthetic resin to fix integrally the monofilaments 28 to the synthetic resin. In this case, each of the monofilaments 28 containing magnetic particles is secured continuously on each of the left and right vertical wall portions 22 of the fastener member 20 along the length direction while being bent in the upper and lower direction.

In the Embodiment 1, for example, a thermoplastic resin, such as a polyester resin, polyamide resin, polypropylene resin, PVC resin, ABS resin, polyethylene resin or copolymer of these resins, is used as the synthetic resin for fastener used as a material of the fastener member 20. A monofilament formed by mixing magnetic particles made of metal, such as iron, cobalt, nickel, or alloy, with a synthetic resin, such as a polyamide resin, polyester resin, is used as the monofilament 28 containing magnetic particles. The magnetic particles herein refer to particles that are magnetically attracted to magnets.

Note that, according to the present invention, materials of the synthetic resin for fastener, the monofilament 28 and magnetic particles forming the fastener member 20 are not particularly limited. Additionally, it is also possible to secure a metal wire rod obtained by bundling and twisting several strands of thin metallic wires made of metal, such as iron, cobalt, nickel or alloy, to the fastener member 20 instead of the monofilament 28 containing magnetic particles.

In the Embodiment 1, the base portion 21 is formed long and narrow plate-shaped, the upper surface (the first surface) and a lower surface (a second surface) of the base portion 21 is formed substantially flat. This base portion 21 supports the left and right vertical wall portions 22 and a plurality of the engagement elements 23. Note that, the upper surface of the base portion 21 refers to a surface facing upside of the base portion 21 except a part in which the left and right vertical wall portions 22 and the plurality of the engagement elements 23 are connected.

In the Embodiment 1, the fact the upper surface and the lower surface of the base portion 21 is substantially flat includes a main surface not only being completely flat but also being wavy or uneven. For example, it is possible to form uneven shape by an embossing process on the lower surface of the base portion 21, or to secure a non-woven fabric or meshed fabric (mesh material) on the lower surface of the base portion 21. This allows the fastener member 20 to effectively enhance a securing strength to the cushion body in securing the fastener member 20 to the cushion body, as described later.

The left and right vertical wall portions 22 are formed along the front and rear direction on the upper surface of the base portion 21. The monofilaments 28 containing magnetic particles described above are secured on the left and right vertical wall portions 22 one by one in a state of being bent up and down in a zigzag shape along the length direction. Each of the left and right vertical wall portions 22 has a plurality of vertical wall bodies 22a provided at a constant forming pitch along the front and rear direction, and reinforcing ribs 22 provided on an inner side surface and an outer side surface of each of the vertical wall bodies 22a. Herein, the inner side surface of the vertical wall body 22a refers to a wall surface located on the side of which faces the engagement area in the vertical wall body 22a, the outer side surface refers to a wall surface located on the opposite side of the inner side surface in the width direction.

The vertical wall body 22a is formed by the monofilament 28 containing magnetic particles being secured by the synthetic resin (the synthetic resin for fastener) that forms a part of the vertical wall body 22a. Each of the vertical wall bodies 22a has a constant width dimension (a dimension in the width direction), and is formed in a shape showing substantially a trapezoidal shape of which a length dimension in the front and rear direction is gradually decreased upward in side view of the fastener member 20.

The monofilaments 28 containing magnetic particles are continuously secured on a plurality of the vertical wall bodies 22a forming each of the left and right vertical wall portions 22. This enables the surface fastener 10 to be magnetically attracted to and held at a fastener attaching portion of a die by utilizing magnetic force generating between a magnet placed in the die and the magnetic particles in the monofilaments 28 secured on each of the left and right vertical wall portions 22, when the surface fastener 10 is set in the die used for foam-molding of the cushion body, as described later. Additionally, a self-alignment effect can be stably obtained by utilizing the above magnetic force, in which a position and direction of the surface fastener 10 to be set in the die can be automatically adjusted corresponding to a position and direction of the magnet of the die. Thus, the position and direction of the surface fastener 10 with respect to the die can be adjusted accurately and automatically.

Note that, in the present invention, the vertical wall body 22a may be formed, for example, by performing a two-color molding using a synthetic resin containing magnetic materials with the synthetic resin (the synthetic resin for fastener) forming the base portion 21 instead of securing the monofilament 28 containing magnetic particles to the vertical wall body 22a along the length direction. A surface fastener of which the vertical wall body 22a is formed by such two-color molding can also be magnetically attracted to and held at a fastener attaching portion of the die, and the self-alignment effect of the surface fastener 10 can be exhibited.

The reinforcing ribs 22b of the vertical wall portions 22 are provided one by one on each of the inner side surface and the outer side surface in the width direction of each of the vertical wall bodies 22a. The reinforcing rib 22b extends upward from the base portion 21 and is integrally formed with the vertical wall body 22a. By being provided such a pair of the reinforcing ribs 22b on each of the vertical wall bodies 22a, the monofilaments 28 containing magnetic particles can be stably secured on the vertical wall portions 22. The secured monofilaments 28 can also be less likely to detach from the vertical wall portions 22. Note that, in the Embodiment 1, although the reinforcing ribs 22b of the vertical wall portion 22 are provided by one by one on each inner side surface and outer side surface in the width direction of the vertical wall body 22a, the reinforcing rib 22b may not be provided on the inner side surface in the width direction of the vertical wall portion 22. A plurality of reinforcing ribs 22b may also be provided on the inner side surface and a plurality of reinforcing ribs 22b may also be provided on the outer side surface in the width direction of the vertical wall body 22a.

Each engaging element 23 has a standing portion that stands up from the base portion 21, and an engaging head portion (also referred to a hook portion) branching, curving and extending forward and backward from an upper end portion of the standing portion. A branching part of the engaging head portion that branches forward and backward is concaved downward. The engaging head portion is also formed so that it gradually becomes thinner and thinner toward a front hook tip and a rear hook tip.

In the Embodiment 1, the maximum value of the height dimension (a dimension in the height direction) of the engaging element 23 from the upper surface of the base portion is smaller than the height dimension of the vertical wall portion 22 from the upper surface of the base portion 21 to a top end surface (an upper surface) of the vertical wall body 22a. As a result, the masking top surface exposing upward of the masking member 30 held on the fastener member 20 can be located at a lower position than an upper surface of the vertical wall portion 22 (in other words, at a position close to the base portion 21). Note that, in the present invention, a shape and size of the engaging element 23 are not limited and can be changed freely.

A plurality of the engaging elements 23 are arranged on the base portion 21 regularly in the length direction and the width direction so that a predetermined engaging force (a connecting force) can be obtained with the loop member that is to engage with the fastener member 20. In the case of Embodiment 1, an engaging element row 26 in the length direction (the longitudinal direction) is formed by a plurality of the engaging elements 23 arranged in one low at a predetermined pitch along the length direction of the base portion 21. In the Embodiment 1, a forming pitch of a plurality of the engaging elements 23 in the length direction arranged in one engaging element row 26 is the same as a forming pitch of a plurality of the vertical wall bodies 22a in the length direction forming one vertical wall portion 22.

The engaging area 25 of the fastener member 20 of the Embodiment 1 is formed by aligning four rows of the engaging element rows 26 along the length direction in the width direction. Herein, the engaging area 25 of the fastener member 20 is an area in which the loops of the loop member can be engaged. The engaging area 25 refers to an area from an outer side surface (a left side surface) of the engaging element 23 of the engaging element row 26 located at the leftmost side to the outer side surface (a right side surface) of the engaging element 23 of the engaging element row 26 located at the rightmost side, with respect to the width direction of the fastener member 20. The engaging area 25 is also formed across substantially the whole part of the fastener member 20 along the length direction of the fastener member 20.

A plurality of the engaging elements 23 are arranged at positions shifted in the length direction between the two engaging element rows 26 adjacent to each other in the width direction. In the Embodiment 1, in particular, each of the engaging elements 23 forming one of the two adjacent engaging element rows 26 is placed at a position shifted by a half size of the forming pitch of the engaging element 23 in the length direction from positions of the engaging elements 23 forming the other engaging element row 26. Thus, a plurality of the engaging elements 23 of the Embodiment 1 are arranged in a staggered pattern in the engaging area 25. Note that, the positions of the engaging elements 23 arranged in a staggered pattern are not limited to the above. It is only necessary that the engaging element 23 forming one of the adjacent two engaging element rows 26 and the engaging element 23 forming the other engaging element row 26 are shifted in viewing from the width direction.

Each ear portion 24 of the fastener member 20 extends outside in the width direction from the left and right side edges of the base portion 21. In this case, the left and right side edges of the base portion 21 are located outer side of the left and right vertical wall portions 22 in the width direction. A plurality of the ear portions 24 provided on the left side and a plurality of the ear portions 24 provided on the right side with respect to the base portion 21 are alternate with each other in the length direction of the base portion 21. Each ear portion 24 has an ear body portion 24a extending from the base portion 21 in the width direction and a plurality of the protruding wall portions 24b protruding on an upper surface of the ear body portion 24a. The ear body portion 24a is formed continuously from the base portion 21 and has the same thickness as the base portion 21. A plurality of protruding wall portions 24b are disposed along the length direction of the base portion 21.

The ear portion 24 can be embedded in the cushion body in foam-molding of the cushion body by such left and right ear portions 24 being disposed on the fastener member 20 as described above. This allows the surface fastener 10 (the fastener member 20) to enhance the securing strength with respect to the cushion body. Note that, in the present invention, such as a shape, size, pattern to provide the ear portion 24 are not particularly limited to the above. The fastener member 20 may also be formed without providing the ear portion 24.

The masking member 30 of the Embodiment 1 is long and substantially plate-shaped having a masking top surface (a first surface, an upper surface) and a masking back surface (a second surface, a lower surface). The masking back surface refers to a surface of the masking member 30 facing the upper surface of the base portion 21, and the masking top surface refers to a surface that is arranged on the opposite side of the masking back surface of the masking member 30 in the upper and lower direction. Unevenness is provided on the masking back surface. The masking member 30 is detachably held by the fastener member 20 described above. The masking member 30 is formed of a synthetic resin (a synthetic resin for masking) or an elastomer (an elastomer for masking) that is softer than the synthetic resin for fastener forming the fastener member 20. As a material of the masking member 30, for example, a synthetic resin for masking having such as a thermoplastic property PVC resin, or an elastomer for masking having such as thermoplastic property thermoplastic polyester-based or polyurethane-based is used. As the masking member 30 is formed by the synthetic resin for masking or the elastomer for masking that is softer than the fastener member 20, the engaging element 23 can be less likely to be deformed or damaged in peeling off the masking member 30 from the fastener member 20.

The masking member 30 is provided between the left and right vertical wall portions 22 with covering the engaging area 25 of the fastener member 20 from above. The masking member 30 has a larger width dimension than the engaging area 25 of the fastener member 20, and continuously formed across substantially the whole part of the length direction of the fastener member 20.

An external form of the masking member 30, in viewing of a cross-section perpendicular to the length direction (see FIG. 3), has substantially a rectangular shape. Additionally, the masking member 30 has two recessed channel portions 31 extending from the masking back surface facing the base portion 21 of the masking member 30 toward the masking top surface provided on the opposite side of the masking back surface to form an uneven shape on the masking back surface. In other words, the two recessed channel portions 31 extend toward direction (that is, upward) away from the upper surface of the base portion 21 as well as are provided on the masking back surface.

The masking member 30 has the cross-sectional shape described above continuously across the whole part of the length direction of the masking member 30. That is, the cross-section of the masking member 30 shows the same shape in every position of the length direction of the masking member 30. Note that, the cross-sectional shape of the masking member 30 herein refers to not only a part of the synthetic resin forming the masking member 30 itself but also a part of the engaging elements 23 embedded in the masking member 30.

The masking member 30 has wall contacting portions 32 that contact the left and right vertical wall portions 22 of the fastener member 20. The masking member 30 of the Embodiment 1, in particular, contacts inner side reinforcing ribs 22b disposed on the left and right vertical wall portions 22, and is away from the vertical wall bodies 22a of the vertical wall portions 22.

The masking top surface of the masking member 30 is a surface exposing on an upper side of the masking member 30, is formed substantially flat in the Embodiment 1. This masking top surface is arranged at a lower position (a position closer to the base portion 21) than an upper surface of the vertical wall body 22a of the vertical wall portion 22 in the height direction.

The masking member 30 is attached on the fastener member 20 with the masking back surface away from the upper surface of the base portion 21. For this reason, a space portion 33 is provided between the masking back surface and the upper surface of the base portion 21. In this case, the minimum value of the height dimension of the space portion 33 formed between the masking member 30 and the upper surface of the base portion 21 is equal to or less than the maximum value of the height dimension of the engaging element 23, preferably 50% or less of said maximum value, more preferably 30% or less of said maximum value. This allows at least a part of the engaging elements 23 to be stably embedded in the masking member 30. Herein, a fact that a part of the engaging element 23 is embedded in the masking member 30 refers that a part of the engaging element 23 is wrapped by the masking member 30, or the masking member 30 is filled around and covers a part of the engaging element 23.

The space portion 33 of the Embodiment 1, is continuously formed between the left and right vertical wall portions 22 in the width direction except for a part in which the engaging elements 23 of the fastener 20 is arranged. That is, the masking member 30 of the Embodiment 1 is away from the base portion 21 via the space portion 33 in the whole part of the engaging area 25. This enables the masking member 30 to be more easily peeled off in removing the masking member 30 from the fastener member 20. Note that, in the Embodiment 1, the space portion 33 may be dividedly formed in two or more parts in the width direction between the left and right vertical wall portions 22 by a part of the masking member 30 partially contacting the upper surface of the base portion 21.

The two channel portions 31 having a recessed shape from the masking back surface toward the masking top surface are provided on the masking member 30 as described above. Each of the left and right channel portions 31 extends along the height direction from the masking back surface and is formed along the length direction in the whole of length direction of the masking member 30. Each of the left and right channel portions 31 has a pair of left and right inner channel wall surfaces that is provided to face each other, and a channel bottom portion that is concave surface shaped and provided on an upper end portion of the channel portion 31.

Such recessed channel portion 31 is formed on the masking member 30, thereby, a thin portion 35 is provided on the masking member 30 corresponding to a position in which the channel portion 31 is formed (see FIG. 3). In the thin portion 35, the height dimension h from the channel bottom portion of the channel portion 31 of the masking back surface to the masking top surface is smaller than a height dimension of the masking member 30 at a position in which the channel portion 31 is not formed. In this case, the height dimension h of the thin portion 35 is smaller than the height dimension of the engaging element 23 from the upper surface of the base portion 21.

In the Embodiment 1, two channel portions 31 of the masking member 30 are provided corresponding to positions of the engaging element rows 26 located at the leftmost side and the rightmost side of the four engaging element rows 26 formed along the length direction on the fastener member 20. Herein, the engaging element rows 26 of the leftmost side and the rightmost side can be said the engaging element rows 26 adjacent to the left and right vertical wall portions 22.

As the left and right channel portions 31 are provided on the masking member 30 described above, a part of the engaging element 23 of the engaging element row 26 adjacent to the vertical wall portion 22 is placed in the channel portion 31 of the masking member 30, and thus a depth at which the engaging element 23 is embedded in the masking member 30 (that is, a depth at which the engaging element 23 is embedded in the thin portion 35) can be made shallow. Additionally, the engaging elements 23 of the two engaging element rows 26 arranged in the middle portion of the four element rows 26 of the fastener member 20 (that is, the engaging elements 23 arranged at a position not corresponding to the channel portions 31 of the masking member 30) are embedded deeper in the masking member 30 than the engaging elements 23 placed in the channel portions 31.

In this case, the engaging elements 23 that are deeply embedded in the masking member 30 (that is, the engaging elements 23 of the two engaging element rows 26 arranged in the middle portion) are defined as anchoring engaging elements 23a, and the engaging element rows 26 formed by the anchoring engaging elements 23a in the length direction are defined as anchoring engaging element rows. Whereas, the engaging elements 23 arranged corresponding to the channel portions 31 of the masking member 30 (that is, the engaging elements 23 of the engaging element rows 26 adjacent to the left and right vertical wall portions 22) are defined as peeling engaging elements 23b, and the engaging element rows 26 formed by the peeling engaging elements 23b in the length direction are defined as peeling engaging element rows.

The left and right channel portions 31 provided on the masking member 30 are formed so that the height dimension from the upper surface of the base portion 21 to the channel bottom portion is smaller than the maximum value of the height dimension of the engaging element 23 from the upper surface of the base portion 21. This enables a part of the peeling engaging element 23b to be embedded in the masking member 30 certainly. Additionally, each of the left and right channel portions 31 of the masking member 30 is formed so that a distance between a pair of the inner channel wall surfaces facing each other of the channel portion 31 is larger than the maximum value of the width dimension (a dimension of the width direction) of one engaging element 23. Thus, a part of the peeling engaging element 23b is placed in the channel portion 31 and held in a state of not being embedded in the masking member 30. As a result, the depth embedded in the masking member 30 of the peeling engaging element 23b can be surely made shallower than that of the anchoring engaging element 23a.

In the Embodiment 1, for example, a part upper than the masking back surface of the anchoring engaging element 23a is embedded in the masking member 30. In other words, half or more of the standing portion of the engaging element 23 in the height direction, and the whole part of the engaging head portion of the engaging element 23, are embedded in the masking member 30. This allows the fastener member 20 to enhance the strength to hold the masking member 30, and thus the fastener member 20 can stably keep the state in which the masking member 30 is attached to the fastener member 20.

Whereas, the peeling engaging element 23b is wrapped by the thin portion 35 of the masking member 30, and at least a part upper than a height position of tip end portions (a front end portion and a rear end portion) of the engaging head portion in the front and rear direction is embedded in the masking member 30. That is, the engaging elements 23 and the engaging element rows 26 of the surface fastener 10 of the Embodiment 1 include two types of engaging elements 23 and engaging element rows 26 having different embedded depths, such as the anchoring engaging element 23a and the anchoring engaging element row that are deeply embedded in the masking member 30, and the peeling engaging element 23b and the peeling engaging element row that are shallowly embedded in the masking member 30. As the peeling engaging elements 23b are included in the engaging elements 23 of the Embodiment 1, in other words, as some of the engaging elements 23 are embedded in the thin portion 35 of the masking member 30, the masking member 30 can be easily peeled off with relatively weak strength when the masking member is peeled off and removed from the fastener member 20.

Note that, in the present invention, the anchoring engaging element may be such an engaging element in which at least a part of the engaging head portion is embedded in the masking member. For example, the anchoring engaging element may be such an engaging element that a part upper than a tip end portion of the engaging head portion is embedded in the masking member, but that the standing portion is unembedded in the masking member. The peeling engaging element may be such an engaging element that is embedded shallower than the anchoring engaging element in the masking member, or that is unembedded in the masking member at all. Additionally, the peeling engaging elements may include both engaging elements that is embedded in the masking member shallower than the anchoring engaging element, and that is unembedded in the masking member at all.

Additionally, in the surface fastener 10 of the Embodiment 1, a cross-section of the masking member 30 perpendicular to the length direction, as described above, has the same shape continuously along the length direction of the masking member 30. Furthermore, a plurality of the engaging elements 23 arranged in one engaging element row 26 are embedded in the masking member 30 at the same depth in each engaging element row 26. Consequently, the masking member 30 can be stably held on the fastener member 20, and the masking member 30 can also be stably peeled off from the fastener member 20.

In the Embodiment 1, a bending portion 34 is provided that is partially detached from the fastener member 20 at a one end portion of the masking member 30 in the length direction. This bending portion 34 is formed by bending the one end portion of the masking member 30 to the direction away from the fastener member 20. As such bending portion 34 is provided at the end portion of the masking member 30 in the length direction, operations to peel off the masking member 30 from the fastener member 20 become easier. That is, when starting to peel off the masking member 30 from the fastener member 20, the end portion of the masking member 30 can be easily held with fingers, jigs or the like, and thereby the masking member 30 can be easily peeled off. Note that, in the present invention, it is possible to form a surface fastener without providing a bending portion in the masking member.

Next, a manufacturing apparatus and a manufacturing method for manufacturing the surface fastener 10 of the Embodiment 1 described above will be explained.

Figure 5:
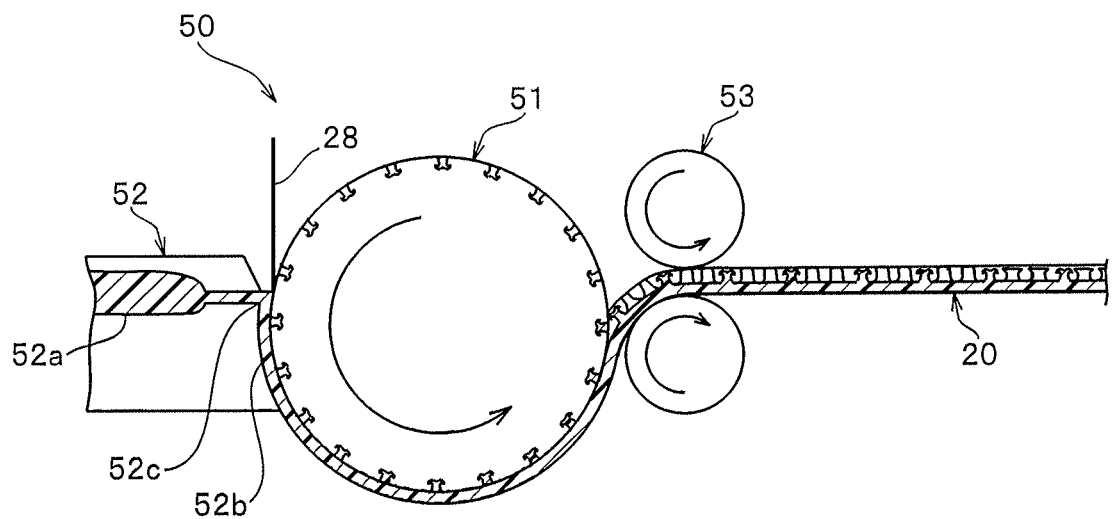
FIG. 5 is a schematic view schematically showing a first molding apparatus used for manufacturing the surface fastener shown in FIG. 1.
Figure 6:
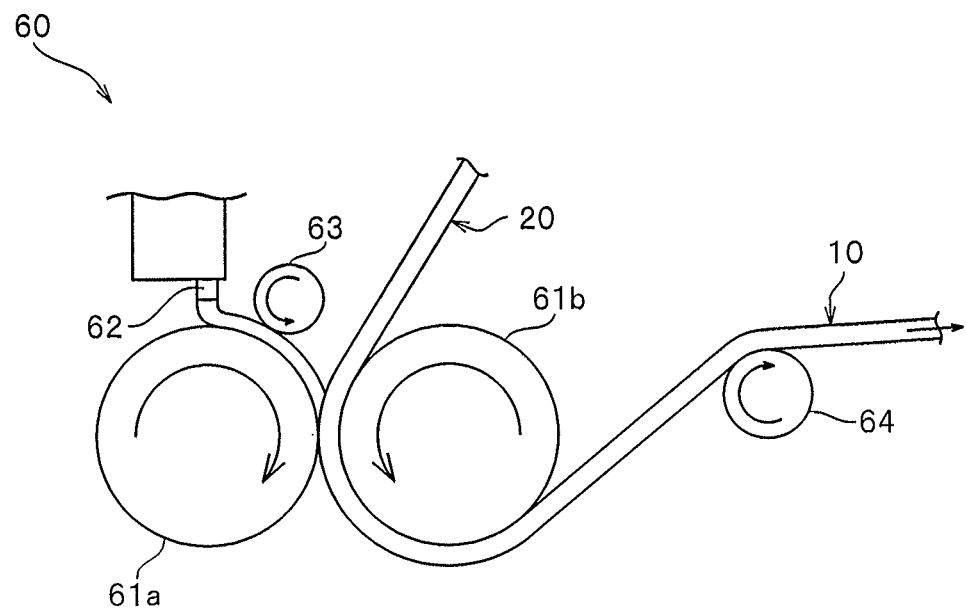
FIG. 6 is a schematic view schematically showing a second molding apparatus used for manufacturing the surface fastener shown in FIG. 1.

The manufacturing apparatus of the Embodiment 1 includes a first molding apparatus 50 used for molding the fastener member 20 as shown in FIG. 5, a second molding apparatus 60 used for molding the masking member 30 and attaching the masking member 30 to the fastener member 20 as shown in FIG. 6, and a cutting apparatus (not shown) disposed on the downstream side of the second molding apparatus 60.

The first molding apparatus 50 shown in FIG. 5 includes a die wheel 51 that rotatably drives in one direction (a counterclockwise direction in the drawing), a first nozzle portion 52 that is disposed to face an outer peripheral surface of the die wheel 51 and supplies the molten synthetic resin for fastener, a monofilament supplying portion (not shown) for introducing the monofilament 28 containing magnetic particles between the die wheel 51 and a resin supplying port 52c of the first nozzle portion 52, and a pickup roller 53 that is disposed on the downstream side (forward side of the machine direction) in the rolling direction of the die wheel 51 with respect to the first nozzle portion 52.

The die wheel 51 of the first molding apparatus 50 is formed in a cylindrical shape. The die wheel 51, although not shown in the drawings, includes a plurality of laminated plates formed in a ring shape or donut shape with a required thickness, and a rotating shaft portion secures the laminated plates as well as inserted into a central opening portion of a plurality of the overlapping laminated plates.

On the outer peripheral surface portion of the die wheel 51 (that is, an outer peripheral portion of the laminated plates), molding cavities (not shown) for molding the vertical wall portion 22, the engaging element 23 and the protruding wall portion 24b of the ear portion 24 of the fastener member 20 are formed using conventionally known techniques, such as an electrical discharge machining, laser processing, and etching processing.

Furthermore, the die wheel 51 is formed to be able to circulate coolant inside of the die wheel 51 for effectively cooling the surface fastener member 20 molded on its outer peripheral surface portion. Below the die wheel 51, a coolant tank (not shown) is disposed, in which a lower half part of the die wheel 51 is immersed.

In the first nozzle portion 52, as shown in FIG. 5, a flow path portion 52a in which the synthetic resin for fastener forming the fastener member 20 is flowed through in a molten state, a wheel-facing surface 52b disposed to face the outer peripheral surface of the die wheel 51, and the resin supplying port 52c discharges the synthetic resin for fastener in a molten state from the flow path portion 52a as well as disposed on the wheel-facing surface 52b, are provided. A constant distance corresponding to the thickness of the base portion 21 of the fastener member 20 is provided between the wheel-facing surface 52b of the first nozzle portion 52 and the curved outer peripheral surface of the die wheel 51.

The pickup roller 53 has a pair of an upper holding roller and a lower holding roller that hold the fastener member 20 molded on the outer peripheral surface of the die wheel 51 from above and below. The upper holding roller and lower holding roller of the pickup roller 53 are disposed to face each other at a predetermined distance. This pickup roller 53 can continuously peel off the fastener member 20 from the die wheel 51, which is molded on the outer peripheral surface portion of the die wheel 51, and sandwich said fastener member 20 by the upper holding roller and the lower holding roller and convey it downstream.

The second molding apparatus 60 shown in FIG. 6 includes a pair of left and right attaching rollers 61a, 61b, a second nozzle portion 62 that supplies the synthetic resin for masking (or the elastomer for masking) in a molten state, a molding roller (a masking roller) 63 that gives a predetermined shape to the synthetic resin for masking supplied to the left attaching roller 61a, a fastener supplying portion (not shown) that supplies the fastener member 20 toward the right attaching roller 61b, and a conveying roller 64 that conveys the fastener member 20 passed between the left and right attaching rollers 61a, 61b downstream.

The left attaching roller 61a and the right attaching roller 61b are rotatably disposed at a predetermined distance from each other between both rollers 61a, 61b. In the Embodiment 1, outer peripheral surfaces of the left and right attaching rollers 61a, 61b are formed flat. The left attaching roller 61a and the right attaching roller 61b are provided to rotate in opposite directions to each other. A distance that is the same size as the height dimension of the surface fastener 10 from the masking top surface to a back surface of the base portion 21 is provided between the left attaching roller 61a and the right attaching roller 61b.

The second nozzle portion 62 of the second molding apparatus 60 is provided to be able to supply the synthetic resin for masking (or the elastomer for masking) to the outer peripheral surface of the left attaching roller 61a.

The molding roller 63 is disposed between a position of the second nozzle portion 62 and a position of the left and right attaching rollers 61a, 61b are closest to each other, and is also disposed to have a distance with respect to the left attaching roller 61a. An outer peripheral surface of the molding roller 63 has uneven shape so that the masking back surface of the masking member 30 is formed to have a predetermined surface shape as shown in FIG. 3 when the masking member 30 is attached to the fastener member 20.

The cutting apparatus (not shown) disposed on the downstream side of the second molding apparatus 60 has a cutter portion that can be vertically raised and lowered. This cutting apparatus can form the left and right ear portions 24 on the fastener member 20 by lowering the cutter portion toward the conveyed surface fastener 10 and punching out a part of the fastener member 20.

In manufacturing the molded surface fastener 10 of the Embodiment 1 using the above manufacturing apparatuses, first, the fastener member 20 before forming the ear portion 24 is manufactured by the first molding apparatus 50. In manufacturing process of the fastener member 20 by the first molding apparatus 50, the synthetic resin for fastener in a molten state is continuously poured out from the first nozzle portion 52 and supplied to the die wheel 51. At the same time, the monofilament 28 containing magnetic particles from the monofilament supplying portion (not shown) is introduced between the outer peripheral surface of the die wheel 51 and the first nozzle portion 52.

Thus, the base portion 21 of the fastener member 20 is molded between the first nozzle portion 52 and the die wheel 51. Additionally, the left and right vertical wall portions 22, the engaging elements 23 and the protruding wall portions 24b of the ear portions 24 of the fastener member 20 are molded by each cavity provided on the outer peripheral surface portion of the die wheel 51, as well as the monofilaments 28 are secured on the left and right vertical wall portions 22.

As a result, the fastener member 20 on which the ear portion 24 is unprovided can be continuously formed on the outer peripheral surface portion of the die wheel 51 along the machine direction (MD). At this time, the fastener member 20 to be molded is cooled by half-rotating while being held on the outer peripheral surface portion of the die wheel 51. Then, the fastener member 20 is continuously peeled off from the die wheel 51 by the pickup roller 53 and conveyed toward the second molding apparatus 60.

Subsequently, in the second molding apparatus 60, a process is operated in which the molten synthetic resin for masking is supplied to the left attaching roller 61a, and the synthetic resin for masking is attached to the fastener member 20, which is molded by the first molding apparatus 50, by the left and right attaching rollers 61a, 61b.

First, in the second molding apparatus 60, the synthetic resin for masking (or the elastomer for masking) in a molten state is supplied to the outer peripheral surface of the left attaching roller 61a from the second nozzle portion 62. At the same time, the fastener member 20, which is molded by the first molding apparatus 50, is supplied toward the right attaching roller 61b from the fastener supplying portion (not shown).

Next, the synthetic resin for masking supplied to the left attaching roller 61a is brought into contact with the rotating molding roller 63, and thus such a shape that enables to form the masking back surface of the masking member 30 is given to the surface of the synthetic resin for masking opposite to the surface in contact with the attaching rollers.

Then, on the downstream side of the molding roller 63, the synthetic resin for masking given a predetermined shape is attached to the molded fastener member 20 by the left and right attaching rollers 61a, 61b before said synthetic resin gets cured. At this time, a part of each engagement element 23 of the fastener member 20 is embedded into the synthetic resin for masking. Additionally, as a predetermined distance is set between the left and right attaching rollers 61a, 61b beforehand, the space portion 33 can be stably provided between the base portion 21 of the fastener member 20 and the synthetic resin for masking.

After the synthetic resin for masking is attached to the fastener member 20 by the left and right attaching rollers 61a, 61b, the fastener member 20 is conveyed in the rolling direction by the right attaching roller 61b and further conveyed downstream by the conveying roller 64. In this process, the masking member 30 can be formed by curing the synthetic resin for masking attached to the fastener member 20. Further, the space portion 33 can be provided between the masking member 30 and the base portion 21 as well as a part of the engaging element 23 can be embedded into the formed masking member.

Subsequently, the fastener member 20 with the masking member 30 attached by the second molding apparatus 60 is conveyed toward the cutting apparatus (not shown), and a cutting process in which the cutter portion of this cutting apparatus partially punch out a part of the fastener member 20 is performed. The left and right ear portions 23 are accordingly formed on the fastener member 20. Furthermore, the surface fastener 10 with the ear portion 24 formed is cut into a predetermined length by this cutting apparatus.

Thereafter, the one end portion of the masking member 30 is partially detached from the fastener member 20 by, for example, an apparatus to detach masking members, and the bending portion 34 is formed on the masking member 30 by bending the detached one end portion. Thus, the surface fastener 10 of the Embodiment 1 shown in FIG. 1 is smoothly and stably manufactured. In the Embodiment 1, as a predetermined shape is given to the synthetic resin for masking using the molding roller 63 of the second molding apparatus 60 as described above, in particular, the surface fastener 10 can be easily manufactured including the anchoring engaging element 23a and the peeling engaging element 23b, which depths embedded in the masking member 30 are different from each other.

In the surface fastener 10 of the Embodiment 1 manufactured by the above manufacturing method, the masking member 30 is detachably held by the fastener member 20, and the engaging area 25 of the fastener member 20 is covered by the masking member 30.

Such surface fastener 10 of the Embodiment 1, in foam-molding of the cushion body (the foam body) of automobile seats, for example, is integrally secured to a predetermined position of the molded cushion body. Herein, foam-molding of the cushion body which integrates the surface fastener 10 will be briefly described.

Although not shown in the drawings, a die used for molding the cushion body has, for example, a lower die (a fixed die), an upper die (a movable die), and an injection nozzle to inject the foam resin into a cavity space in the upper die and the lower die. Additionally, at least one fastener holding portion, in which the surface fastener 10 is placed and held, is provided. A magnet, which is able to attract the magnetic particles of the monofilament 28 secured on the vertical wall portion 22 of the surface fastener 10, is embedded inside of or near the fastener holding portion. Note that, in the present invention, a shape and structure of the die for molding are not limited, and can be freely modified.

In foam-molding of the cushion body using such die, first, the surface fastener 10 is placed at the fastener holding portion of the die at a direction in which the masking member 30 faces a cavity surface of the die. At this time, since the magnetic particles contained in the vertical wall portion 22 of the surface fastener 10 are magnetically attracted by the magnet of the die, the surface fastener 10 is held at the fastener holding portion.

In the surface fastener 10 of the Embodiment 1, the upper surface (the top end surface) of the vertical wall body 22a of the vertical wall portion 22 of the fastener member 20 is placed at a higher position (a position away from the base portion 21) than the masking top surface of the masking member 30 in the height direction, in particular. Thus, when the surface fastener 10 is held at the fastener holding portion of the die, the upper surface of the vertical wall portion 22 containing magnetic particles of fastener member 20 can be brought into close contact with a fastener attaching surface of the fastener holding portion. As a result, the magnet of the die strongly attracts the magnetic particles contained in the vertical wall portion 22, and the fastener holding portion can stably hold the surface fastener 10.

Furthermore, as the masking top surface of the masking member 30 is placed at a lower position than the upper surface of the vertical wall body 22a of the vertical wall portion 22, the masking top surface can be held at a position away from the fastener attaching surface of the fastener holding portion of the die when the surface fastener 10 is held at the fastener holding portion of the die. This enables the fastener holding portion of the die to contact only the upper surface of the vertical wall portion 22 of the fastener member 20.

Thus, when a position and direction of the molded surface fastener 10 are automatically adjusted utilizing the self-alignment effect by the magnetic force of the surface fastener 10, the frictional force can be reduced, which is generated between the surface fastener 10 and the fastener holding portion of the die, and the molded surface fastener 10 can be easily moved with respect to the fastener holding portion of the die. As a result, a position and direction of the surface fastener 10 can be adjusted accurately and smoothly according to the magnet placed at the fastener holding portion of the die.

Subsequently, the foam resin for the cushion body is poured by injection from the injection nozzle into the cavity space of the die. The foam resin flows in foaming, and foam-molding of the cushion body (the foam body) takes place accordingly. At this time, in the surface fastener 10 of the Embodiment 1, the masking member 30 covers the engaging area 25 of the fastener member 20 between the left and right vertical wall portions 22 of the fastener member 20. Thus, it is possible to suppress or prevent the foam resin from intruding the engagement area 25 from the width direction of the fastener member 20.

Note that, although the space portion 33 is formed between the masking back surface of the masking member 30 and the base portion 21 of the fastener member 20, this space portion 33 is very small (narrow). For this reason, it is difficult for the foam resin to reach an area of the engaging element 23 with intruding deeply in the small space portion 33 in the width direction, even if the foam resin intrudes the space portion 33 beyond the vertical wall portion 22 from a gap between the vertical wall bodies 22a of the left and right vertical wall portions 22.

Whereas, as the masking member 30 has the same cross-sectional shape across the whole part of the length direction of the masking member 30, the channel portions 31 of the masking member 30 are also provided to be opened at a front edge and a rear edge of the surface fastener 10. Thus, in foam-molding of the cushion body, the foam resin can intrude the opening channel portions 31 of the masking member 30 from the front edge and the rear edge of the surface fastener 10. In this case, by setting opening areas of the channel portion 31 that open at the front edge and the rear edge of the surface fastener 10 properly, distances at which the foam resin intrudes the channel portions 31 can be controlled.

As above, by intentionally allowing the foam resin to intrude the channel portions 31 of the masking member 30 from the front edge and the rear edge of the surface fastener 10, the front end portion and the rear end portion of the base portion 21 of the fastener member 20 can be partially embedded in the foam-molded cushion body. Furthermore, in the surface fastener 10 of the Embodiment 1, the bending portion 34 described above is provided at the one end portion of the masking member 30 in the length direction. For this reason, a part of the base portion 21 can be stably embedded in the cushion body by allowing the foam resin to intrude between the bending portion 34 of the masking member 30 and the base portion 21 of the fastener member 20. Thus, at least a part of the front end portion and the rear end portion of the base portion 21 is actively embedded in the cushion body, and there by the front end portion and the rear end portion of the surface fastener 10 can be effectively enhanced the securing strength to the cushion body and can be made difficult to detach from the cushion body.

Additionally, in foam-molding of the cushion body, the ear portion 24 of the fastener member 20 can be embedded and held inside of the molded cushion body by flowing the foam resin intruding the surroundings of the ear portion 24 of the fastener member 20. This enables the surface fastener 10 to enhance the securing strength to the cushion body more effectively.

Consequently, when foam-molding is completed in the die, the cushion body on which the surface fastener 10 is secured at a required position is manufactured. At this time, as the masking member 30 is attached on the fastener member 20 of the surface fastener 10, a plurality of the engaging elements 23 of the fastener member 20 can be exposed outside by peeling off and removed the masking member 30 from the fastener member 20 after foam-molding.

In the surface fastener of the Embodiment 1, in particular, the four engaging element rows 26 along the length direction of the fastener member 20 include the two anchoring element rows, which is deeply embedded in the masking member 30, and the two peeling element rows, which is shallowly embedded in the masking member 30. Thus, in the Embodiment 1, for example, the engaging element 23 receives less damage by the synthetic resin for masking when the masking member 30 is formed by attaching the synthetic resin for masking to the fastener member 20, for example, compared to a case in which all four engaging element rows of the fastener member are anchoring element rows. Additionally, a resistance by the engaging elements 23 can be reduced when the masking member 30 is peeled off from the fastener member 20, and as a result the masking member 30 can be easily peeled off from the fastener member 20 with relatively weak strength. Therefore, it is less likely to cause a deformation and damage of the engagement elements 23 in peeling off the masking member 30.

Furthermore, in the Embodiment 1, the bending portion 34 described above is provided at the one end portion of the masking member 30 in the length direction. Thereby, the one end portion of the masking member 30 can be easily held with such as fingers or special jigs, which makes operations to peel off the masking member 30 from the fastener member 20 easy.

After the masking member 30 is peeled off from the fastener member 20, the engaging area 25 comprised of a plurality of the engaging elements 23 is formed between the left and right vertical wall portions 22 on the fastener member 20 left on the cushion body. Being covered by masking member 30 in foam-molding, this engaging area 25 is not intruded by the foam resin. This allows the surface fastener 10 (the fastener member 20) of the Embodiment 1, from which the masking member 30 is peeled off, to stably obtain inherent engaging strength of a plurality of the engaging elements 23 provided on the fastener member 20.

Consequently, when a covering member is made to cover the surface of the resulting cushion body, the loops of the loop member provided on the back surface of the covering member can be stably engaged with the engaging elements 23 of the surface fastener 10. Thus, the covering member can be stably fastened with the cushion body without the covering member lifting from the cushion body, so that the covering member can be attached to the surface of the cushion body accurately. Furthermore, the molded surface fastener 10 is firmly secured to the cushion body, a state of fastening the covering member with the cushion body can be stably maintained.

Note that, in the surface fastener 10 of the Embodiment 1, as shown in FIG. 3, the upper surface of the vertical wall body 22a of the fastener member 20 is placed at higher position than the masking top surface of the masking member 30 in the height direction, to which the present invention is not limited, though. As showing a surface fastener 10a according to the first modified example of the Embodiment 1 in FIG. 7, for example, the upper surface of the vertical wall body 22a of the surface member 20 may be placed at the same position in the height direction as the masking top surface of a masking member 30a. Note that, in this first modified example, further in the second to eighth modified examples and the Embodiments 2 to 4, which are described later, explanations are omitted about portions or members that have substantially the same structures as the surface fastener 10 of the Embodiment 1 described above, by showing the same reference signs.

Figure 7:
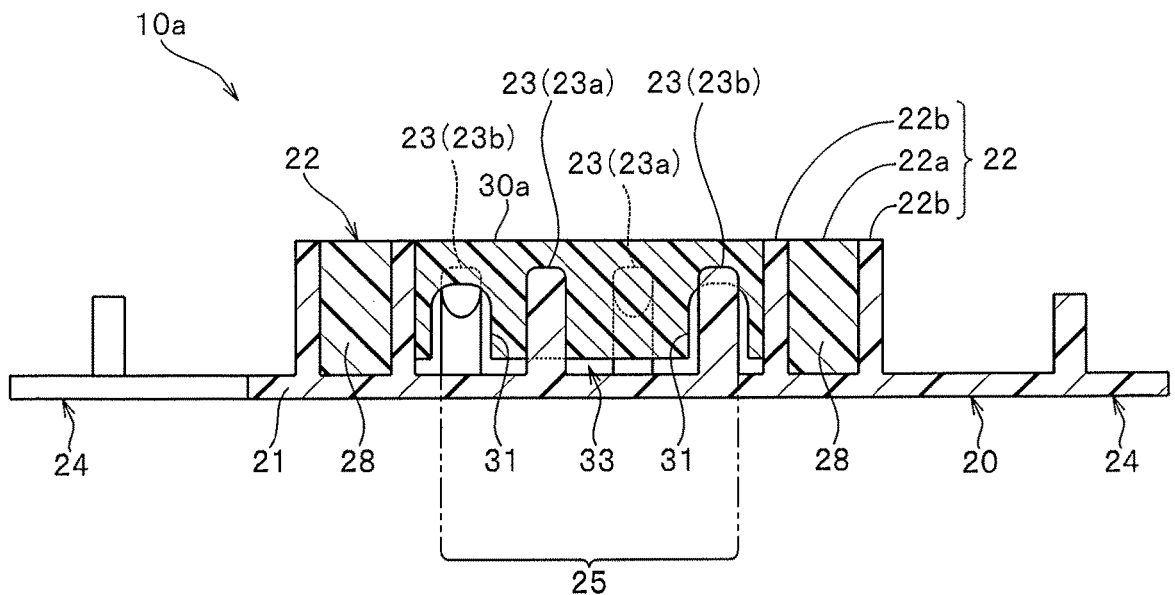
FIG. 7 is a cross-sectional view schematically showing a surface fastener according to a first modified example of the Embodiment 1.

In the case shown in FIG. 7, in which the masking top surface of the masking member 30a is placed at the same height position as the upper surface of the vertical wall body 22a, the upper surface of the vertical wall portion 22 of the fastener member 20 that contains magnetic particles (that is, the upper surface of the vertical wall body 22a), can also be brought into close contact with the fastener attaching surface in which a magnet is provided of the fastener holding portion of the die, when the surface fastener 10a is held in the molding die of the cushion body. Thus, the surface fastener 10a can be stably held at the fastener holding portion as in the Embodiment 1. Additionally, a self-alignment effect of the surface fastener 10a can be exhibited, and a position and a direction of the surface fastener 10a can be automatically adjusted.

Furthermore, in the surface fastener 10 of the Embodiment 1 described above, the masking member 30 is formed to have a symmetric shape in the left and right direction provided two channel portions 31 as shown in FIG. 3 in viewing of a cross-section perpendicular to the length direction of the masking member 30. In the Embodiment 1, however, a cross-sectional shape of the masking member 30 is not limited to having this symmetric shape, and can be formed to have such other cross-sectional shapes shown in FIGS. 8 to 13 as surface fasteners 10b to 10g according to the second to seventh modified examples are shown in FIGS. 8 to 13.

Figure 8:
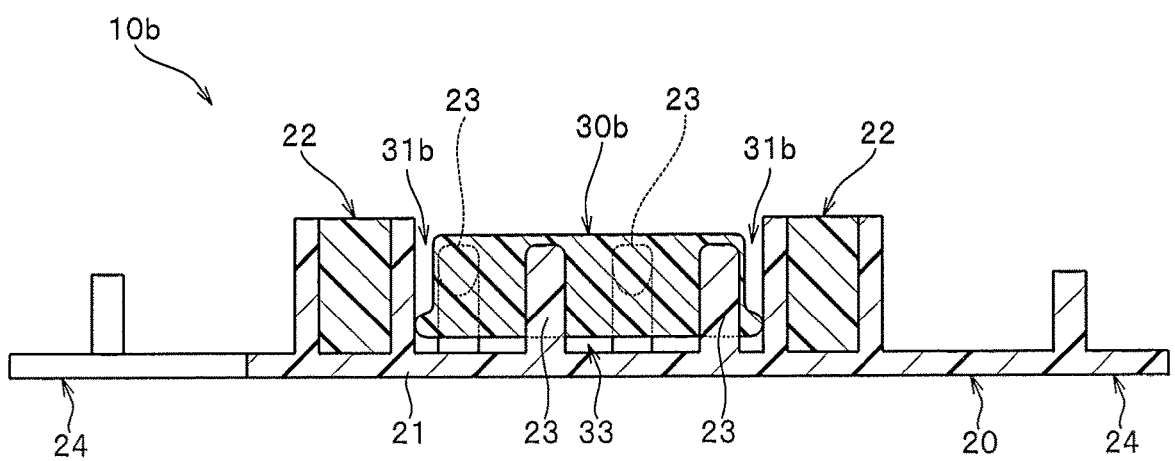
FIG. 8 is a cross-sectional view schematically showing a surface fastener according to a second modified example of the Embodiment 1.

A masking member 30b of a surface fastener 10b according to the second modified example shown in FIG. 8, for example, is formed to have the space portion 33 provided between the masking back surface and the upper surface of base portion 21, and to have a shape in which the all four engaging element rows 26 of the fastener member 20 are embedded at the same depth. In this case, the masking member 30b of the second modified example has left and right channel portions 31b provided downward in a groove-shape from the masking top surface so that a contacting area of the masking member 30b with the left and right vertical wall portions 22 are smaller than that of the surface fastener 10 of the Embodiment 1 described above.

Such masking member 30b of the second modified example attached to the fastener member 20 can stably prevent the foam resin from intruding the engaging area 25 of the fastener member 20 in foam-molding of the cushion body. Additionally, the masking member 30b can be easily and smoothly peeled off from the fastener member 20 after foam-molding of the cushion body because the left and right channel portions 31b are provided on the masking member 30b as well as the space portion 33 is provided between the masking back surface and the upper surface of the base portion 21. As a result, the engaging element 23 is less likely to be deformed or damaged when the masking member 30b is peeled off from the fastener member 20.

Figure 9:
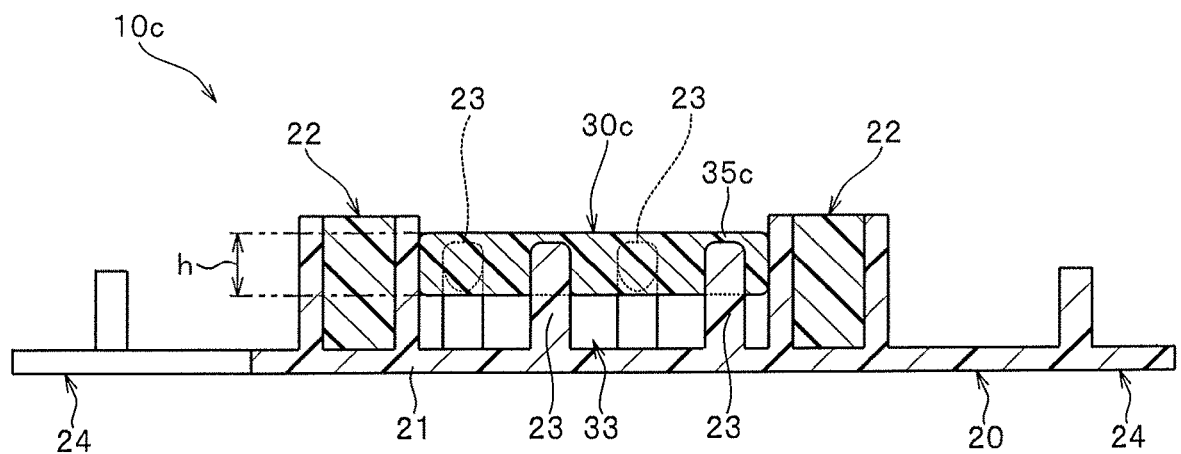
FIG. 9 is a cross-sectional view schematically showing a surface fastener according to a third modified example of the Embodiment 1.

A masking member 30c according to the third modified example shown in FIG. 9, is formed to have the space portion 33 provided between the masking back surface and the base portion 21, and to have a shape in which the four engaging element rows 26 of the fastener member 20 are shallowly embedded at the same depth. In this case, the height dimension h of a thin portion 35c from the masking back surface to the masking top surface is smaller than that of the engaging element 23 from the upper surface of the base portion 21. Additionally, the thin portion 35c of the third modified example is provided across the whole part of the masking member 30c.

By attaching such masking member 30c of the third modified example to the fastener member 20, the masking member 30c is stably held on the fastener member 20. Additionally, in foam-molding of the cushion body, the foam resin can be prevented or suppressed from intruding the engaging area 25 from the width direction of the fastener member 20. Whereas, in foam-molding of the cushion body, the foam resin can easily intrude the space portion 33 between the masking back surface and the base portion 21 from a front edge and a rear edge of a surface fastener 10c, because the relatively big space portion 33 is provided between the masking back surface and the upper surface of base portion 21. Thus, the front end portion and the rear end portion of the base portion 21 can be stably embedded in the cushion body and the fastener member 20 can be made difficult to detach from the cushion body.

Furthermore, according to the third modified example shown in FIG. 9, all engaging element rows 26 of the fastener member 20 are shallowly embedded in the masking member 30c, and thus the masking member 30c can be easily and smoothly peeled off from the masking member 20 after foam-molding of the cushion body. For this reason, a damage the engaging element 23 receives from peeling off the masking member 30c is greatly reduced, so that the engaging element 23 is less likely to be deformed or damaged.

Figure 10:
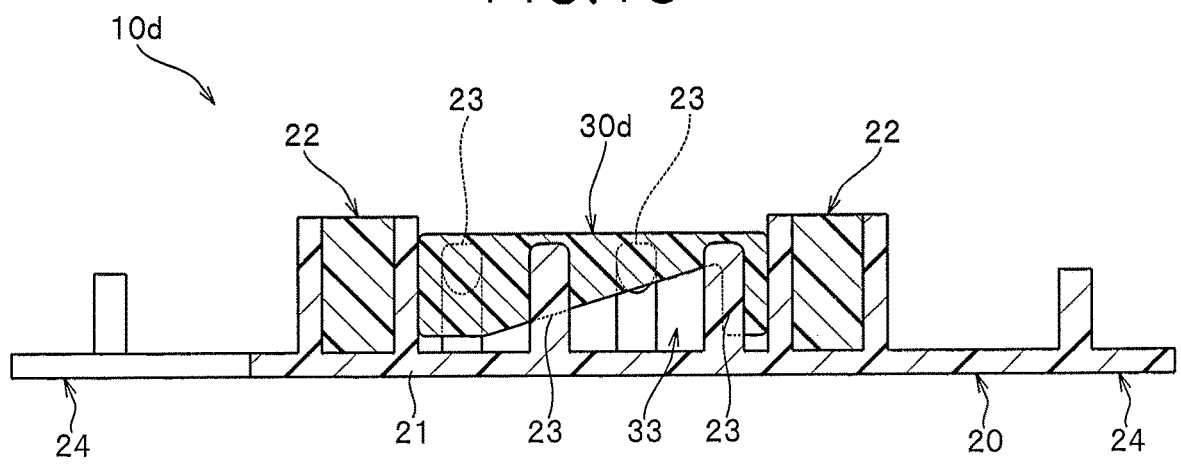
FIG. 10 is a cross-sectional view schematically showing a surface fastener according to a fourth modified example of the Embodiment 1.

A masking member 30d according to the fourth modified example shown in FIG. 10 is formed to have the space portion 33 provided between the masking back surface and the base portion 21, and to have a shape in which a depth at which the engaging element is embedded in the masking member 30d gets gradually deeper (or shallower) toward one direction in the width direction. By attaching such masking member 30d of the fourth modified example to the fastener member 20, in peeling off the masking member 30d from the fastener member 20 after foam-molding of the cushion body, fingers or special jigs can be easily inserted into the space portion 33 between the masking back surface and the base portion 21. This makes it easier to peel off the masking member 30d from its tip portion in the length direction. Additionally, the front end portion and the rear end portion of the base portion 21 can be stably embedded in the cushion body.

Figure 11:
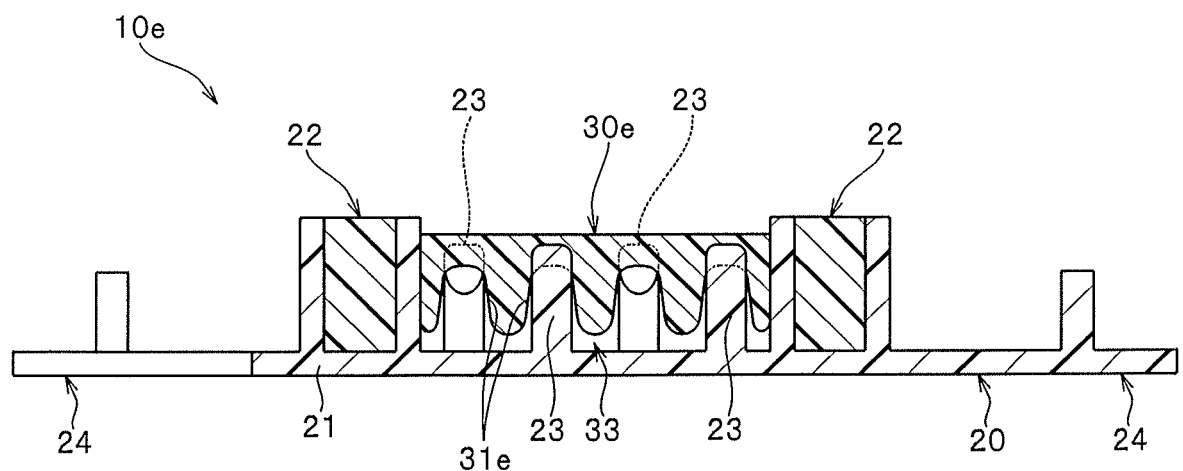
FIG. 11 is a cross-sectional view schematically showing a surface fastener according to a fifth modified example of the Embodiment 1.

A masking member 30e according to the fifth modified example shown in FIG. 11 is formed to have the space portion 33 provided between the masking back surface and the base portion 21, and to have a shape in which four channel portions 31e are provided to shallowly embed the four engaging element rows 26 of the fastener member 20. By attaching such masking member 30e of the fifth modified example to the fastener member 20, the masking member 30e is made to be easily peeled off from the fastener member 20, and it is less likely to cause a deformation and damage of the engagement element 23 in peeling off the masking member 30e.

Figure 12:
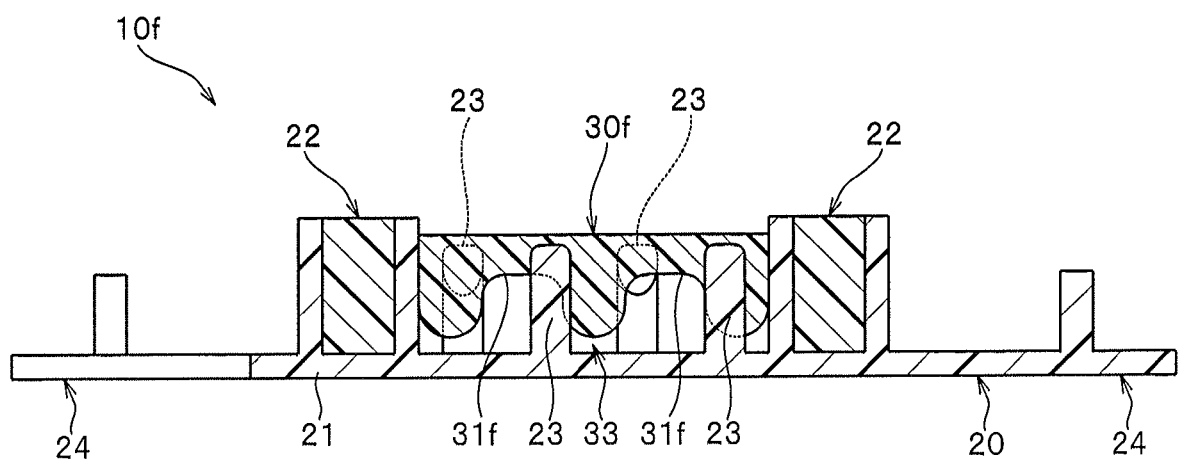
FIG. 12 is a cross-sectional view schematically showing a surface fastener according to a sixth modified example of the Embodiment 1
Figure 13:
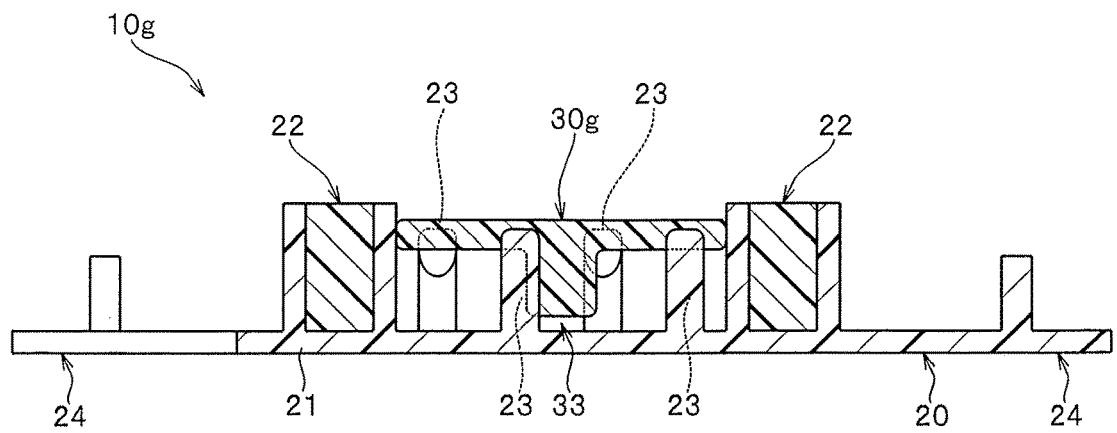
FIG. 13 is a cross-sectional view schematically showing a surface fastener according to a seventh modified example of the Embodiment 1.

A masking member 30f according to the sixth modified example shown in FIG. 12 is formed to have the space portion 33 provided between the masking back surface and the base portion 21, and to have a shape in which channel portions 31f are provided between the first and second rows from the left and between the third and fourth rows from the left of the four engaging element rows 26 of the fastener member 20. Additionally, a masking member 30g of the seventh modified example shown in FIG. 13 is formed to have a cross-sectional shape showing substantially a T shape.

By attaching the masking member 30f of the sixth modified example or the masking member 30g of the seventh modified example described above to the fastener member 20, the foam resin can be prevented or suppressed from intruding the engaging area 25 from the width direction of the fastener member 20 in foam-molding of the cushion body. At the same time, the foam resin can easily intrude into the space portion 33 between the masking back surface and the base portion 21 from front edges and rear edges of the surface fasteners 10f, 10g.

Furthermore, strength of connecting portions 16 provided on a surface fastener 11 can be effectively enhanced with the masking member 30f of the sixth modified example or the masking member 30g of the seventh modified example, in manufacturing, for example, the surface fastener 11 formed to be curved as explained in the below Embodiment 2.

Note that, in the masking members 30d to 30g of the fourth modified example (FIG. 10) to the seventh modified example (FIG. 13), the thin portion is also provided on at least a part of each of the masking members 30d to 30g. The height dimension of the thin portion from the masking back surface to the masking top surface is smaller than that of the engaging element 23 from the upper surface of the base portion 21. The masking members 30d to 30g can be made to be easily peeled off from the fastener member 20 with such thin portion provided. Additionally, it is less likely to cause a deformation and damage of the engagement elements 23 of the fastener member 20 in peeling off the masking members 30d to 30g, and thus a reduction of the engaging strength can be suppressed or prevented.

Furthermore, the bending portion 34 is provided at the one end portion of the masking member 30 to make the masking member 30 easier to peel off from the fastener member 20 in the surface fastener 10 of the Embodiment 1 described above. However, a separation slit 27 to cut away a part of the base portion 21 may be provided at the one end portion or both end portions of the base portion 21 of the fastener member 20 in the length direction, as shown in FIG. 14, which is a bottom view of a surface fastener 10h according to the eighth modified example instead of or in addition to providing the bending portion 34 on the masking member 30.

In this case, the separation slit 27 of the base portion 21 is formed in a shape of a rounded rectangle cut in half in a bottom view of the surface fastener 10h. Additionally, even if such separation slit 27 is provided on the base portion 21, an area surrounded by the separation slit 27 is not fall out from the surface fastener 10h because a part of the engaging element 23 of the fastener member 20 is embedded in the masking member 30.

Figure 14:
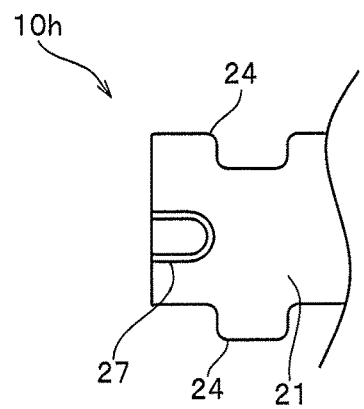
FIG. 14 is a cross-sectional view schematically showing a surface fastener according to an eighth modified example of the Embodiment 1.

By providing the separation slit 27 shown in FIG. 14 at the one end portion or both end portions of the base portion 21 in the length direction, the area of the base portion 21 surrounded by the separation slit 27 of the base portion 21 can be held and pulled up with the masking member 30 by such as fingers or special jigs when the masking member 30 is peeled off from the fastener member 20. Therefore, the masking member 30 can be easily pulled up from its one end portion in the length direction, and then the masking member 30 can be smoothly peeled off from the fastener member 20, so that operations to peel off the masking member 30 from the fastener member 20 become easier.

Note that, the separation slit 27 of the base portion 21 shown in FIG. 14 is formed in a shape of a rounded rectangle cut in half as described above. In the present invention, however, the shape of the separation slit 27 provided on the base portion 21 is not limited. It is also possible to provide the separation slit 27 on the base portion 21 so that the area surrounded by the separation slit 27 shows a shape such as a half-circle, triangle or rectangle.

Embodiment 2

Figure 15:
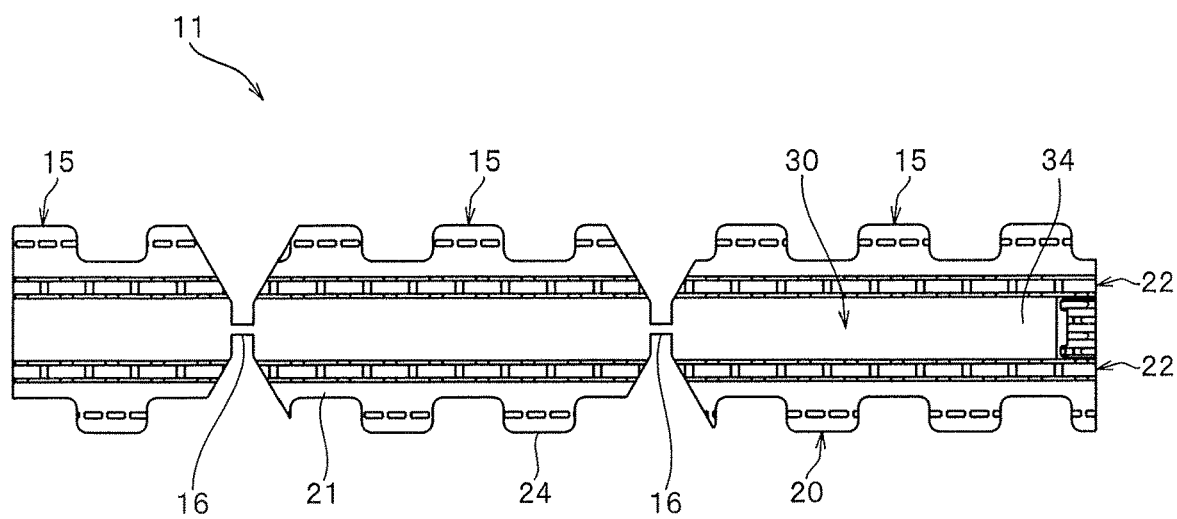
FIG. 15 is a plan view schematically showing a surface fastener according to an Embodiment 2 of the present invention.

FIG. 15 is a plan view schematically showing a surface fastener 11 according to the Embodiment 2 of the present invention.

The surface fastener 11 of the Embodiment 2 shown in FIG. 15 is used in such case that the surface fastener 11 with curved in width direction is integrated with the cushion body in such terms of a usage, design or the like of the cushion body. This surface fastener 11 of the Embodiment 2 is formed to be capable of applying to a curve-like usage type in which the surface fastener 11 is curved in the width direction, by performing a cutting process on the straight surface fastener 10 of the Embodiment 1 shown in FIGS. 1 to 3 used as a primary product.

The surface fastener 11 corresponding to curving shown in FIG. 15 includes a plurality of fastener engaging portions 15 arranged along length direction, and a connecting portion 16, which is flexible and connects the fastener engaging portions 15 adjacent in length direction to each other.

Additionally, the surface fastener 11 of the Embodiment 2 includes the fastener member 20 made of the synthetic resin and the masking member 30 that is detachably held by the upper surface of the fastener member 20. That is, each fastener engaging portion 15 of the Embodiment 2 includes the fastener member 20 and the masking member 30, and each connecting portion 16 of the Embodiment 2 includes the fastener member 20 and the masking member 30. Note that, in the Embodiment 2, lengths (dimensions in the length direction) and widths (dimensions in the left and right direction) of the fastener engaging portion 15 and the connecting portion 16 are not particularly limited, and are accordingly changeable corresponding to such as shapes of the die.

In the Embodiment 2, the fastener member 20 and the masking member 30 are formed in the same manner as the fastener member 20 and the masking member 30 of the Embodiment 1 as previously mentioned, except that a part of the fastener member 20 and a part of the masking member 30 is partially cut off. In this case, the connecting portion 16, which connects adjacent fastener engaging portions 15, can stably have an appropriate strength and rigidity because the connecting portion 16 is formed by the fastener member 20 and the masking member 30.

Thus, the surface fastener 11 can be prevented or suppressed from cutting apart at the connecting portion 16, so that the surface fastener 11 of the Embodiment 2 can be stably attached to the fastener holding portion of the die, even if the fastener holding portion is formed in a complex shape. As a result, an operation to attach the surface fastener 11 to the die can be made easy, which improves work efficiency.

Such surface fastener 11 of the Embodiment 2, as described above, is manufactured by performing the cutting process to the surface fastener 10 of the Embodiment 1 as previously mentioned to remove a part of the fastener member 20 and a part of the masking member 30. Note that, in the Embodiment 2, a method and a means of the cutting process to the surface fastener 10 of the Embodiment 1 are not particularly limited, commonly known conventional cutting methods and means can be used.

According to such surface fastener 11 of the Embodiment 2, even if the fastener holding portion provided in the die for forming the cushion body has a complex shape, such as widely bent or twisted, it can be attached along the fastener holding portion by utilizing the magnetic force. Thus, the self-alignment effect of the surface fastener 11 described above can be efficiently exhibited.

Furthermore, in foam-molding of the cushion body, the foam resin can be prevented or suppressed from intruding the engaging area 25 from the width direction of the fastener member 20 by the masking member 30, as the previously mentioned Embodiment 1. The masking member 30 can also be easily peeled off from the fastener member 20 after foam-molding of the cushion body.

Additionally, in the Embodiment 2, the molded surface fastener 11 corresponding to curving is manufactured from the straight molded surface fastener 10 of the Embodiment 1. For this reason, both straight molded surface fastener 10 and molded surface fastener 11 corresponding to curving, can be manufactured by the same first molding apparatus 50 and the same second molding apparatus 60. Consequently, manufacturing efficiency of the molded surface fasteners 10, 11 of the Embodiments 1 and 2 can be improved, and thus, manufacturing cost can be reduced. Furthermore, manufacturing the surface fastener 11 corresponding to curving by using the straight surface fastener 10 leads to merits of an easy quick response to a demand for each type of the surface fasteners 10, 11 and an easy stock control for each type of the surface fasteners 10, 11.

Note that, in the Embodiment 2, if the fastener engaging portion 15 is formed by the fastener member 20 and the masking member 30, its shape and size are not particularly limited. Additionally, a shape and size of the connecting portion 16 are not particularly limited if the connecting portion 16 is formed by the fastener member 20 and the masking member 30, and the connecting portion 16 has a flexibility that can be curved in at least one direction out of the width direction or the height direction. The connecting portion is, however, preferably formed to have a smaller width dimension than the fastener engaging portion to have an appropriate flexibility. That is, the connecting portion is preferably formed to have a width dimension smaller than the minimum value of the width dimension of the fastener engaging portion.

Embodiment 3

Figure 16:
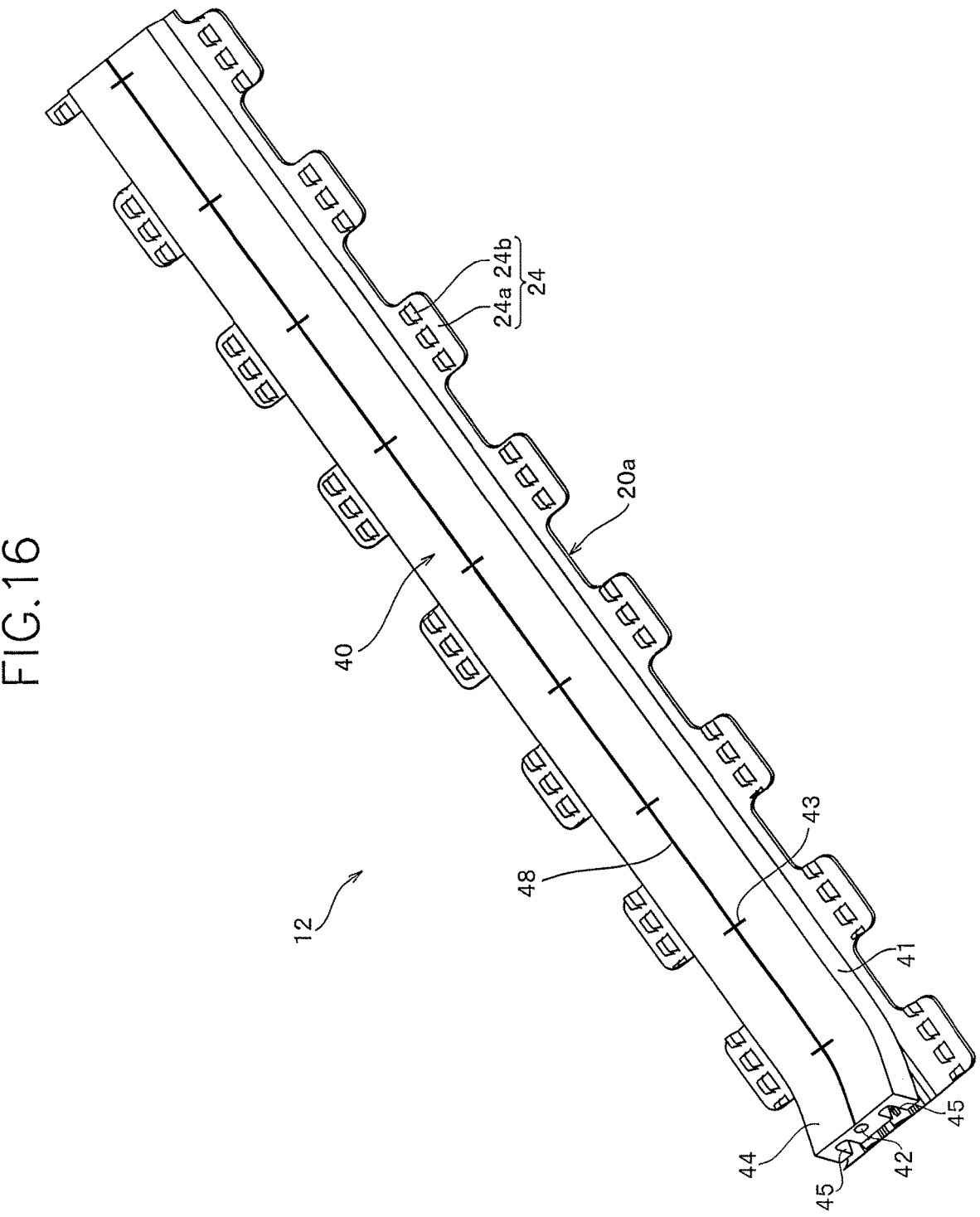
FIG. 16 is a perspective view schematically showing a surface fastener according to an Embodiment 3 of the present invention.
Figure 17:
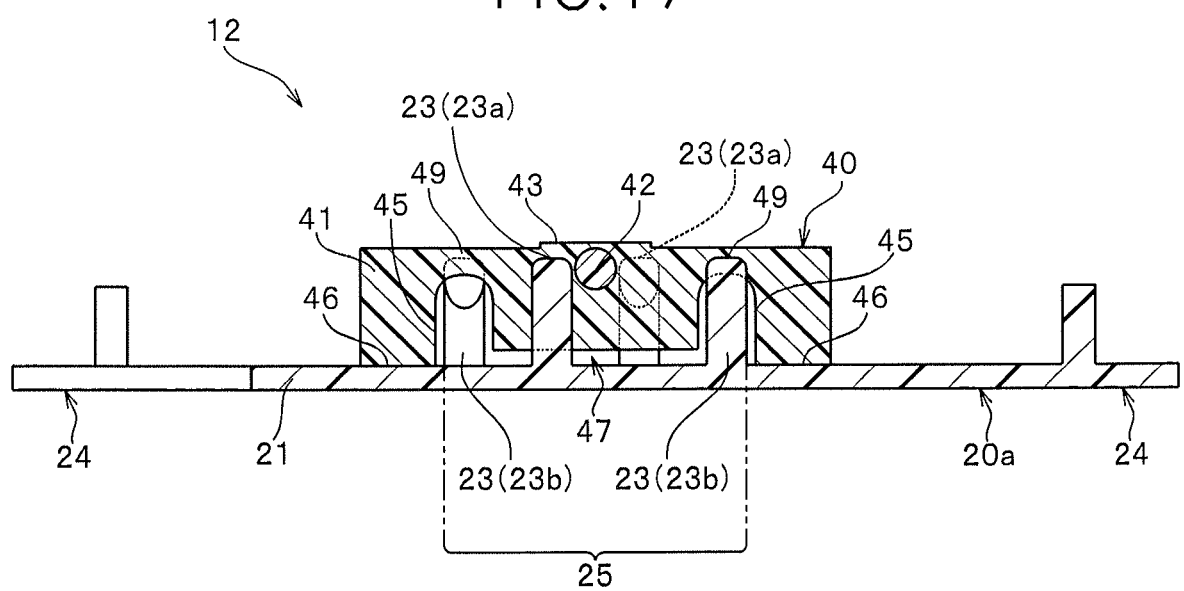
FIG. 17 is a cross-sectional view of the surface fastener shown in FIG. 16.

FIG. 16 is a perspective view schematically showing a surface fastener according to the Embodiment 3. FIG. 17 is a cross-sectional view showing a cross-section perpendicular to the length direction of the surface fastener 12 shown in FIG. 16.

The surface fastener 12 according to the Embodiment 3 includes a fastener member 20a made of the synthetic resin that is formed long in the front and rear direction, and a masking member 40 that is detachably held by the upper surface of the fastener member 20a.

Figure 18:
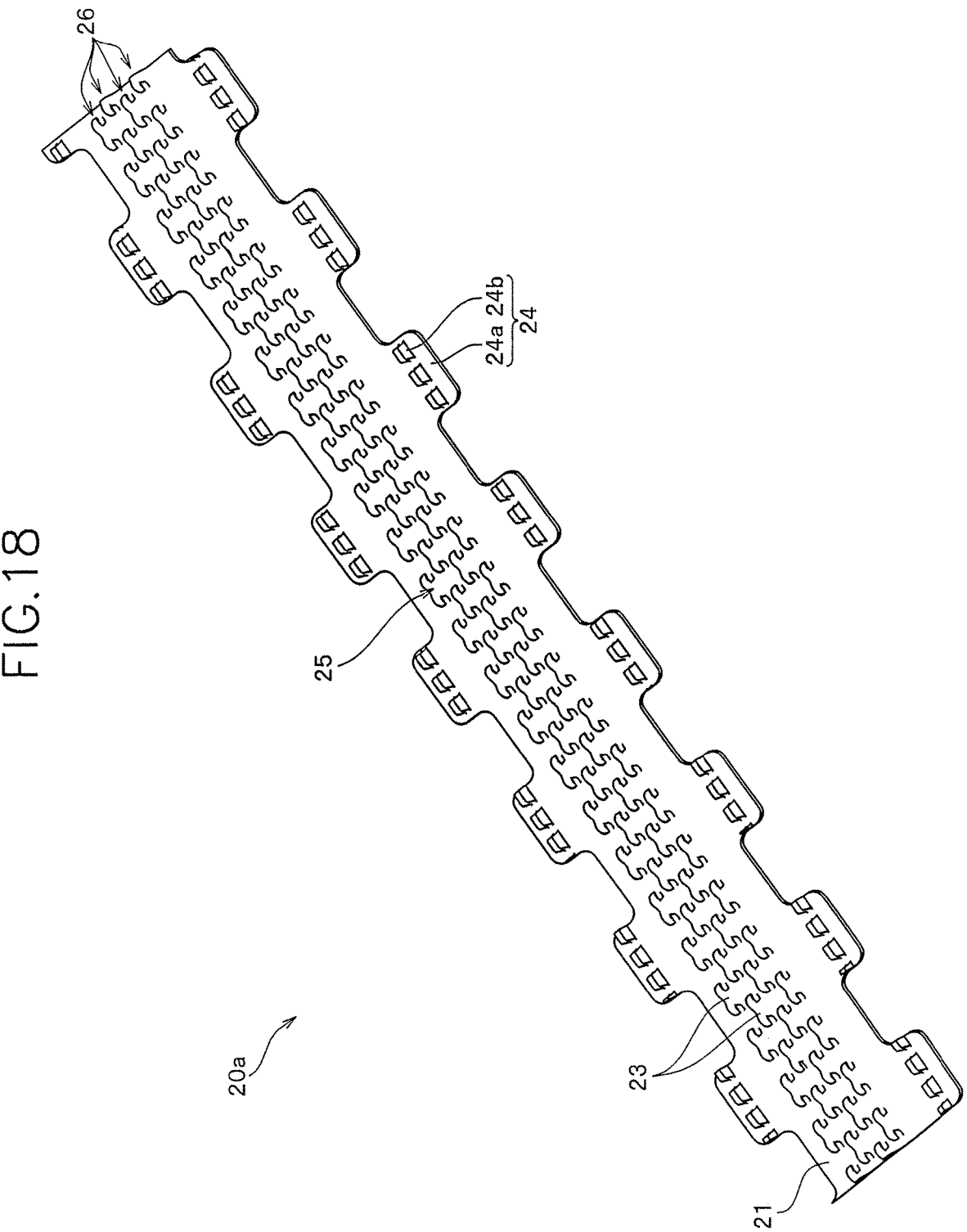
FIG. 18 is a perspective view schematically showing a fastener member of the surface fastener shown in FIG. 16.

The fastener member 20a of the Embodiment 3 has a shape in which the left and right vertical wall portions 22 are omitted from the fastener member 20 of the Embodiment 1 as previously mentioned. That is, the fastener member 20a of the Embodiment 3, as shown in FIG. 18, has the thin plate-shaped base portion 21, a plurality of the hook-shaped engaging elements 23 forming the engaging area 25 as well as extending upward from the base portion 21, and a plurality of the ear portions 24 extending toward the left and right direction from the base portion 21.

The masking member 40 of the Embodiment 3 is detachably held by the fastener member 20a with covering the engaging area 25 of the fastener member 20a from above. The masking member 40 is formed to have a constant larger width dimension than the engaging area 25 of the fastener member 20a, and is continuously formed across substantially the whole part of the length direction of the fastener member 20a.

This masking member 40 has a masking body portion 41, a monofilament 42 containing magnetic particles and embedded in the masking main portion 41, and a plurality of fixing ribs 43 protruded on an upper surface of the masking body portion 41 along the width direction. Additionally, a bending portion 44 is provided at a one end portion of the masking member 40 in the length direction to make the masking member 40 easier to peel off, as the masking member 30 of the Embodiment 1.

In the Embodiment 3, the same material as the masking member 30 of the Embodiment 1, as previously described, is used for the masking body portion 41 and the fixing rib 43. That is, the masking body portion 41 and the fixing rib 43 are integrally molded by the synthetic resin for masking or the elastomer for masking, which is softer than the synthetic resin for fastener forming the fastener member 20a.

The monofilament 42 of the Embodiment 3 is formed by the same material as the monofilament 28 containing magnetic particles that is secured on the fastener member 20 of the Embodiment 1 as previously described. The monofilament 42 containing the magnetic particles of the Embodiment 3 is embedded in an upper end portion of the masking body portion 41 and the middle portion of the masking body portion 41 in the width direction.

In the Embodiment 3, in viewing of a cross-section perpendicular to the length direction of the masking member 40 (see FIG. 17), an external form of the masking body portion 41 shows substantially a rectangular shape. Additionally, the height dimension of the masking body portion 41 (that is, a dimension from the upper surface of the base portion 21 to a surface (the upper surface) of the masking body portion 41) is larger than the maximum value of the height dimension of the engaging element 23.

Two recessed channel portions 45 extending toward the masking top surface from the back surface of the masking body portion 41 are provided on the masking body portion 41. The two recessed channel portions 45 are provided corresponding to a position of the engaging element row 26 located at the leftmost side, and a position of the engaging element row 26 located at the rightmost side of the four engaging element rows 26 formed on the fastener member 20a, and are formed in substantially the same manner as the two channel portions 31 formed on the masking member 30 of the Embodiment 1 as previously described.

The masking body portion 41 has left and right base contacting portions 46 that contact the upper face of the base portion 21. The left and right base contacting portions 46 are provided at outer left and right sides than the engaging area 25 of the fastener member 20a in the width direction. Additionally, a back surface of the masking body portion 41 is provided away from the upper surface of the base portion 21 between the left and right base contacting portions 46 of the masking body portion 41. Thus, a space portion 47 that enables the masking member 40 to be easily peeled off from the fastener member 20a is provided. Note that, the masking body portion 41 of the Embodiment 3 may be formed so that the whole back surface of the masking body portion 41 is away from the upper surface of the base portion 21 without providing the left and right base contacting portions 46.

Furthermore, a thin portion 49 is provided on the masking body portion 41 (see FIG. 17). In the thin portion 49, the height dimension from the channel bottom portion of a channel portion 45 in the masking back surface to the masking top surface is smaller than that of the engaging element 23 from the upper surface of the base portion 21.

In the Embodiment 3, the engaging element rows 26 provided corresponding to the channel portion 45 of the masking body portion 41, are used as the peeling element rows because a depth embedded in the masking member 40 is shallow. Whereas, the two engaging element rows 26 provided at the middle portion in the width direction are used as the anchoring element rows because a depth embedded in the masking member 40 is deeper than that of the peeling element row.

In the Embodiment 3, a part of the engaging head portion of the engaging element 23 of the peeling element row is embedded in the masking member 40. Additionally, in the engaging element of the anchoring element row, more than half of the standing portion in the height direction of the engaging element 23, and the whole part of the engaging head portion of the engaging element 23, are embedded in the masking member 40.

The monofilament 42 containing magnetic particles is embedded linearly in the masking body portion 41 along the length direction. An exposing portion 48 of the monofilament 42 is provided along the monofilament 42 on the upper end portion of the masking body portion 41 in a plan view of the masking body portion 41.

In the masking member 40 of the Embodiment 3, a plurality of the fixing ribs 43 are formed along the width direction across the exposing portion 48 of the masking body portion 41 to prevent the monofilament 42, which is embedded in the masking body portion 41 with partially exposed, from separating from the masking body portion 41. A plurality of the fixing ribs 43 form covering portions to cover the exposing portion 48 of the monofilament 42. In the Embodiment 3, a plurality of the fixing ribs 43 are provided at a certain distance in the length direction. That is, in a plan view of the masking member 40, the monofilament 42 is not completely embedded in the masking body portion 41 at the exposing portion 48, and a part of the monofilament 42 is arranged to protrude or swell outward from a top surface of the masking body portion 41. The monofilament 42 is completely embedded in the masking member 40 at the covering portion, in which the fixing rib 43 is provided.

A plurality of the fixing ribs 43 protrudes upward from the top surface of the masking body portion 41 and are formed integrally with the masking body portion 41. Thus, when the surface fastener 12 is held at the fastener holding portion of the die, the thin fixing rib 43 of the masking member 40 is mainly brought into contact with the fastener holding portion of the die. For this reason, an area in which the surface fastener 12 contacts the fastener holding portion of the die can be made small, and thus a frictional force generated between the surface fastener 12 and the fastener holding portion of the die can be reduced. Consequently, when a position and a direction of the molded surface fastener 12 is automatically adjusted utilizing the self-alignment effect by the magnetic force of the surface fastener 12, the molded surface fastener 12 can be moved more easily and adjusted to a predetermined position and direction more smoothly and stably.

Note that, the masking member 40 of the Embodiment 3 may be formed without providing the fixing rib 43. Additionally, instead of the monofilament 42 containing magnetic particles embedded in the masking body portion 41, the masking member 40 of the Embodiment 3, for example, may include a magnetic area containing magnetic particles continuously formed along the length direction at the upper end portion of the masking body portion 41, by performing a two-color molding using the synthetic resin for masking forming the masking body portion 41 and the synthetic resin containing magnetic particles. By providing such magnetic area, the surface fastener can be magnetically attracted to and held at the fastener holding portion of the die, and the self-alignment effect of the surface fastener can be exhibited.

Next, a manufacturing apparatus for manufacturing the surface fastener 12 of the Embodiment 3 will be explained. The manufacturing apparatus of the Embodiment 3 has a first molding apparatus used for molding the fastener member 20a, a second molding apparatus 70 used for molding the masking member 40 shown in FIG. 19 and a cutting apparatus (not shown) disposed on the downstream side of the second molding apparatus 70. In this case, the cutting apparatus of the Embodiment 3 is the same as the cutting apparatus of the Embodiment 1.

The first molding apparatus of the Embodiment 3 is formed by not providing the monofilament supplying portion and by modifying a form of the molding cavities provided on the outer peripheral surface portion of the die wheel 51 from the Embodiment 1 as compared with the first molding apparatus 50 of the Embodiment 1 shown in FIG. 5.

Figure 19:
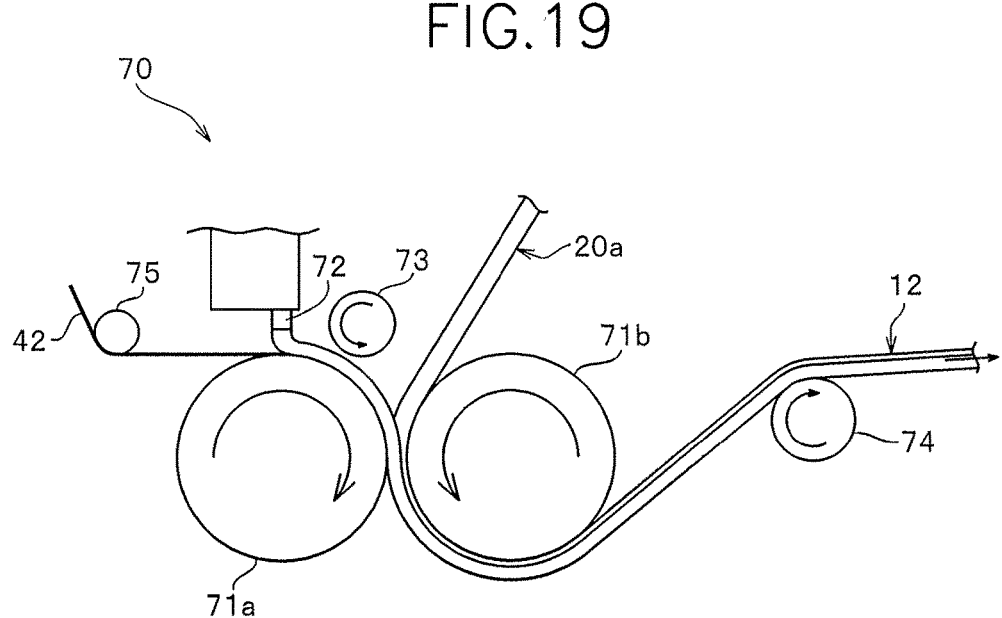
FIG. 19 is a schematic view schematically showing a second molding apparatus used for manufacturing the surface fastener shown in FIG. 16.

The second molding apparatus 70 shown in FIG. 19 includes a pair of left and right attaching rollers 71a, 71b, a second nozzle portion 72 from which the synthetic resin for masking (or the elastomer for masking) is supplied, a monofilament supplying portion (not shown) that supplies the monofilament 42 containing magnetic particles, and a guiding roller 75 that guides the supplied monofilament 42 to an outer peripheral surface of the left attaching roller 71a. Furthermore, this second molding apparatus 70 includes a molding roller 73 that gives a predetermined shape to the synthetic resin for masking supplied to the left attaching roller 71a, a fastener supplying portion (not shown) that supplies the fastener member 20a toward the right attaching roller 71b, and a conveying roller 74 that conveys the fastener member 20a downstream, to which the synthetic resin for masking is attached by left and right attaching rollers 71a, 71b.

In the Embodiment 3, the right attaching roller 71b, the second nozzle portion 72, the fastener supplying portion (not shown), and the conveying roller 74 of the second molding apparatus 70 are formed the same as the right attaching roller 61b, the second nozzle portion 62, the fastener supplying portion (not shown) and the conveying roller 64 of the second molding apparatus 60 of the Embodiment 1 shown in FIG. 6.

In the left attaching roller 71a of the Embodiment 3, a plurality of recessed channel portions (not shown) having a shape and size corresponds to the fixing rib 43 of the masking member 40 are provided on the outer peripheral surface of the left attaching roller 71a along the cross direction (CD) perpendicular to the machine direction (MD) for providing the plurality of the fixing ribs 43 described above on the masking member 40.

In the Embodiment 3, an outer peripheral surface of the molding roller 73 is formed to have a different shape from the molding roller 63 of the Embodiment 1. The outer peripheral surface of this molding roller 73 has an uneven shape so that the masking back surface of the masking member 40 is formed in a predetermined surface shape shown in FIG. 17 when the masking member 40 is attached to the fastener member 20a. Note that the molding roller 73 of the Embodiment 3 is formed the same as the molding roller 63 of the Embodiment 1, except that shapes of the outer peripheral surfaces are different from each other.

In manufacturing the surface fastener 12 of the Embodiment 3 by the molding apparatus described above, first, the fastener member 20a shown in FIG. 18 is manufactured by the first molding apparatus. A manufacturing process of the fastener member 20a of the Embodiment 3 is basically the same as that of the fastener member 20 of the Embodiment 1, except that the monofilament 28 is not supplied in the Embodiment 3. Thus, detailed explanations of the manufacturing process of the fastener member 20a of the Embodiment 3 are omitted.

Next, a process in which the synthetic resin for masking is attached to the fastener member 20a, which is manufactured by the first molding apparatus, is performed using the left and right attaching rollers 71a, 71b in the second molding apparatus 70. In the Embodiment 3, the synthetic resin for masking (or the elastomer for masking) is supplied in a molten state toward the left side attaching roller 71*a* from the second nozzle portion 72 while the monofilament 42 containing magnetic particles is guided to the outer peripheral surface of said left attaching roller 71*a*. Thus, the monofilament 42 is inserted and embedded at a predetermined position of the synthetic resin for masking.

Subsequently, by contacting the synthetic resin for masking in a molten state supplied to the left attaching roller 71*a* with the molding roller 73, a shape that enables to form the masking back surface of the masking body portion 41 is given to the synthetic resin for masking. At this time, since a plurality of the recessed channel portions (not shown) are provided along the cross direction on the outer peripheral surface of the left attaching roller 71*a* as described above, the fixing ribs 43 of the masking member 40 are molded by these plurality of the recessed channel portions.

Thereafter, on the downstream side of the molding roller 73, the synthetic resin for masking before curing is attached to the molded fastener member 20*a* by the left and right attaching rollers 71*a*, 71*b*. At this time, a part of each engaging element 23 of the fastener member 20*a* is embedded into the synthetic resin for masking. Additionally, as a predetermined distance set previously is provided between the left and right attaching rollers 71*a*, 71*b*, the space portion 47 can be stably provided between the base portion 21 of the fastener member 20*a* and the synthetic resin for masking.

After the synthetic resin for masking is attached to the fastener member 20*a* by the left and right attaching rollers 71*a*, 71*b*, the fastener member 20*a* is conveyed downstream by the conveying roller 74. At this time, the masking member 40 can be formed by curing the synthetic resin for masking that is attached to the fastener member 20*a*. Then, a part of the engaging element 23 can be embedded into the formed masking member 40, and the space portion 47 can be formed between the masking member 40 and the base portion 21.

Next, the fastener member 20*a* to which the masking member 40 is attached in the second molding apparatus 70 is conveyed toward the cutting apparatus (not shown), and the left and right ear portions 24 are formed on the fastener member 20*a* as in the Embodiment 1 as previously mentioned. Furthermore, the surface fastener 12 on which the ear portions 24 are formed is cut into a predetermined length by said cutting apparatus.

Subsequently, the one end portion of the masking member 40 is partially peeled off from the fastener member 20*a* by an apparatus to detach masking members, and the bending portion 44 is formed on the masking member 40 by bending that detached portion. Accordingly, the surface fastener 12 of the Embodiment 3 shown in FIG. 16 is stably manufactured.

The surface fastener 12 of the Embodiment 3 thus manufactured is integrally secured to the cushion body in foam-molding of the cushion body of such as automobile seat, as the Embodiment 1. At this time, the surface fastener 12 of the Embodiment 3 can obtain substantially the same effect as the surface fastener 10 of the Embodiment 1.

According to the surface fastener 12 of the Embodiment 3, in holding the surface fastener 12 in the die for foam-molding, a position and direction of the surface fastener 12 with respect to the die can be adjusted accurately, smoothly and automatically utilizing the self-alignment effect of the surface fastener 12 by the magnetic force.

Additionally, in foam-molding of the cushion body, as the engaging area 25 of the fastener member 20*a* is covered by the masking member 40, the foam resin can be suppressed or prevented from intruding the engagement area 25 from the width direction of the fastener member 20*a*. Whereas, the foam resin can intrude into the opening channel portion 45 from a front edge and a rear edge of the surface fastener 12. Thus, the front end portion and the rear end portion of the base portion 21 of the fastener member 20*a* ca be partially embedded in the cushion body, so that the front end portion and the rear end portion of the surface fastener 12 can be made difficult to detach from the cushion body.

Furthermore, after foam-molding of the cushion body, the masking member 40 of the surface fastener 12 can be easily peeled off and removed from the fastener member 20*a*. This enables a plurality of the engaging elements 23 of the fastener member 20*a* to be exposed outside. Additionally, it is less likely to cause a deformation and damage of the engagement element 23.

Note that, in the surface fastener 12 of the Embodiment 3, the masking member 40 is formed to have a symmetric shape in left and right direction as shown in FIG. 17 in viewing of a cross-section perpendicular to the length direction of the masking member 41. In the Embodiment 3, however, the masking member 41 is not limited to having this cross-section, and can be formed to have other cross-sectional shapes such as shapes as shown in FIGS. 8 to 13 (shapes according to the second to seventh modified examples of the Embodiment 1).

In the surface fastener 12 of the Embodiment 3, the bending portion 44 is also provided at the one end portion of the masking member 40 to make the masking member 40 easier to peel off from the fastener member 20*a*. However, the masking member 40 may be made to be easily peeled off by providing the separation slit 27 as shown in FIG. 14 at one end portion or both end portions in the length direction of the base portion 21 of the fastener member 20*a*, instead of or in addition to providing the bending portion 44 on the masking member 40.

Embodiment 4

Figure 20:
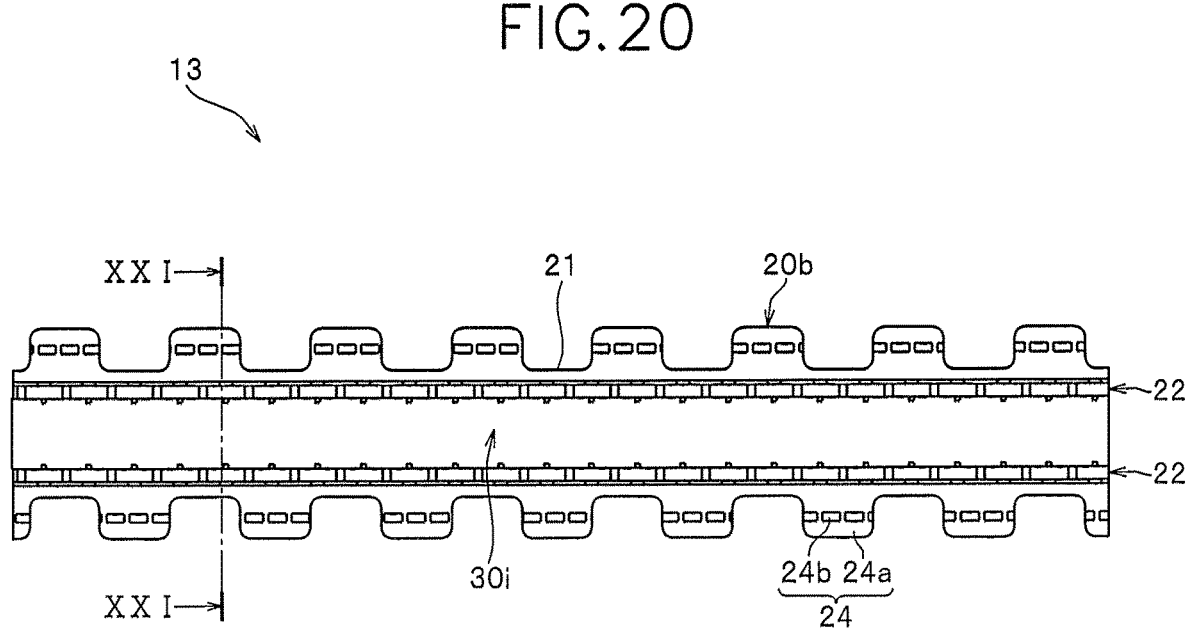
FIG. 20 is a plan view schematically showing a surface fastener according to an Embodiment 4 of the present invention.
Figure 21:
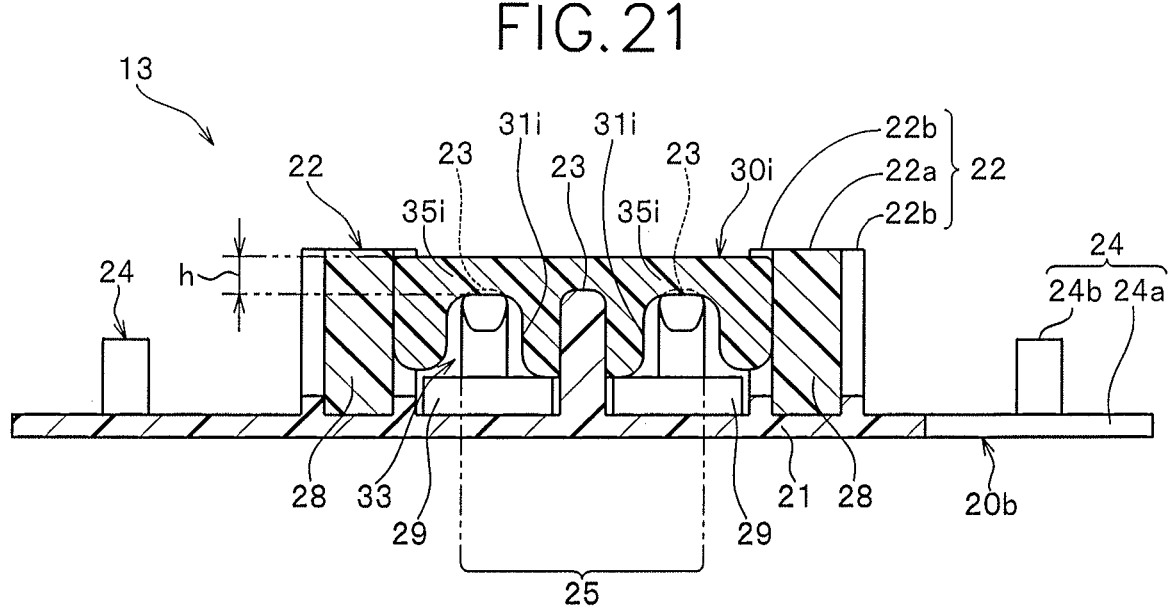
FIG. 21 is a cross-sectional view in XXI-XXI line shown in FIG. 20.

FIG. 20 is a plan view schematically showing a surface fastener 13 according to the Embodiment 4. FIG. 21 is a cross-sectional view in XXI-XXI line shown in FIG. 20.

The surface fastener 13 according to the Embodiment 4 includes a fastener member 20*b* made of the synthetic resin that is formed long in the front and rear direction, and a masking member 30*i* that is detachably held by the fastener member 20*b*. The space portion 33 is also provided between the base portion 21 of the fastener member 20*b* and the masking back surface of the masking member 30*i*.

The fastener member 20*b* of the Embodiment 4 has a shape in which the number of engaging elements 23 forming the engaging area 25 (in particular, the number of rows of the engagement element rows 26 in the width direction) is modified from the fastener member 20 of the Embodiment 1, and in which a plurality of ribs (rising ribs 29 described below) are provided on the upper surface of the base 21.

Figure 22:
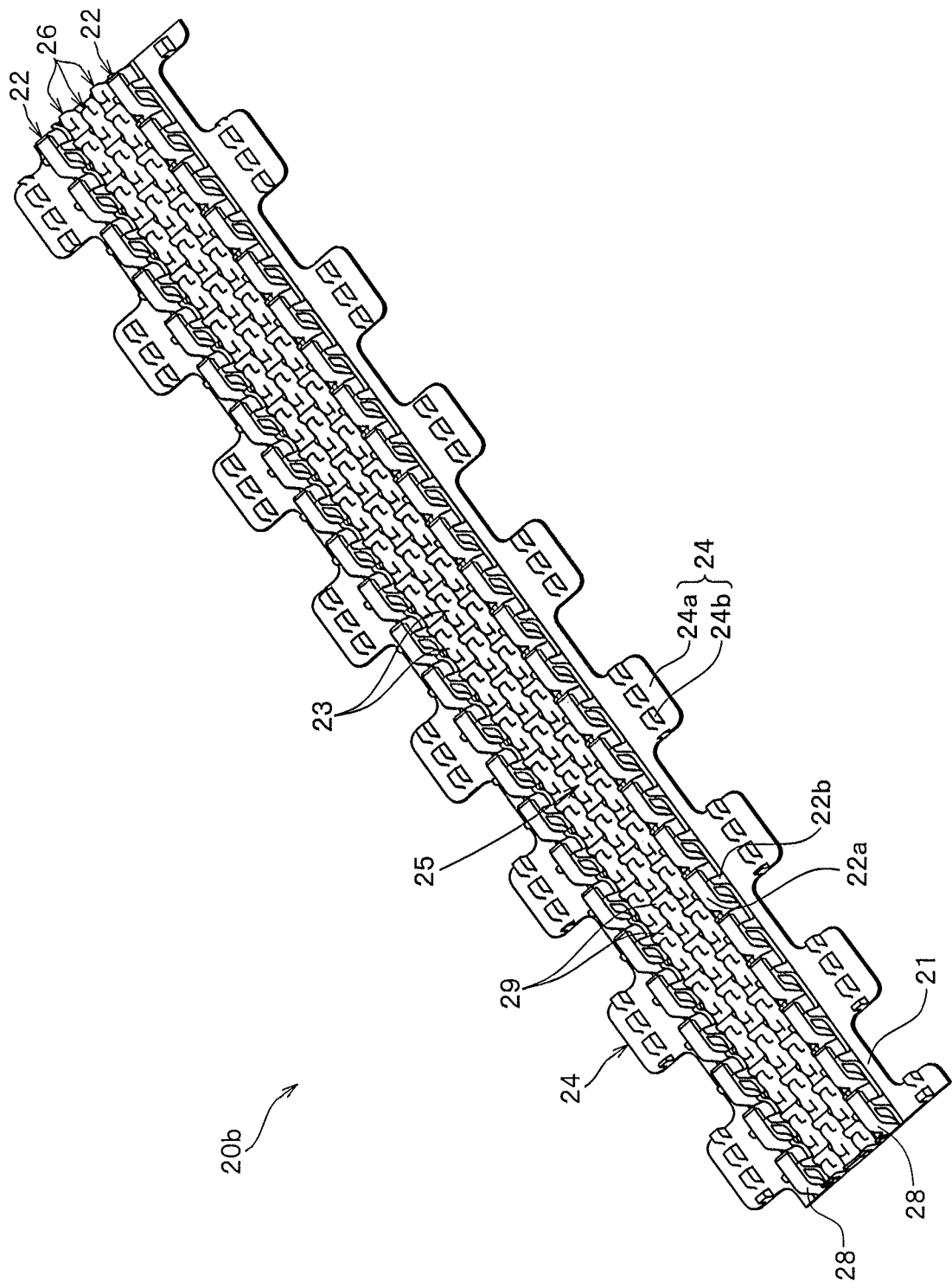
FIG. 22 is a perspective view schematically showing a fastener member of the surface fastener shown in FIG. 20.
Figure 23:
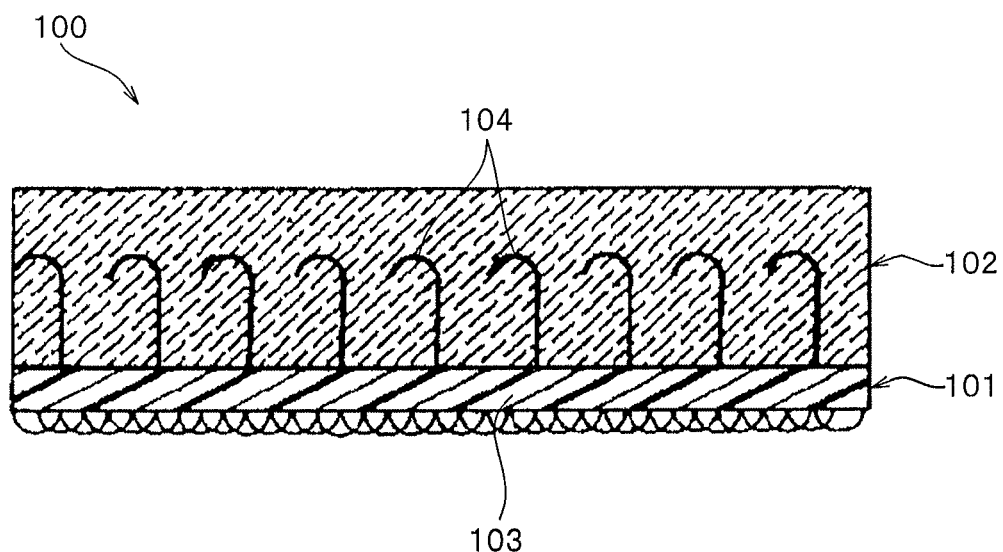
FIG. 23 is a cross-sectional view of a conventional surface fastener.
Figure 24:
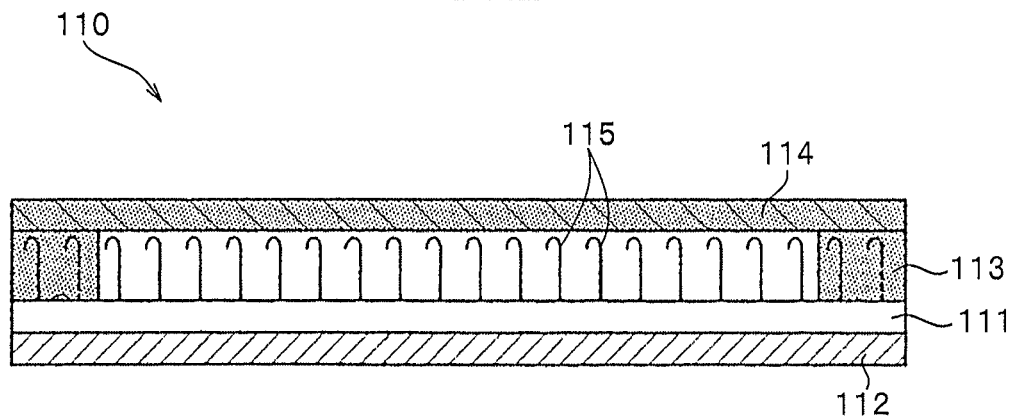
FIG. 24 is a cross-sectional view of another conventional surface fastener.

To be more specific, the fastener member 20*b* of the Embodiment 4 includes the plate-shaped base portion 21, the left and right vertical wall portions 22 disposed upright at the left and right side edge portions of the base portion 21, a plurality of the engaging elements 23 arranged between the left and right vertical wall portions 22, a plurality of the ear portions 24 extending toward the width direction from the base portion 21, and a plurality of rising ribs 29 protruding upward from the base portion 21, as shown in FIG. 22. In this case, the base portion 21, the vertical wall portion 22, and the ear portion 24 of the Embodiment 4 are formed the same as those of the previously described Embodiment 1.

Each engaging element 23 is also formed the same as that of the previously described Embodiment 1.

The engaging area 25 is provided that is formed by a plurality of the engaging elements 23 placed regularly in the length direction and the width direction between the left and right vertical portions 22. In the engaging area 25 of the Embodiment 4, the engaging element rows 26 along the length direction are arranged in three rows in the width direction. In this case, a plurality of the engagement elements 23 are arranged in a staggered pattern in the engaging area 25.

The rising rib 29 rises in a shape of ridge along the width direction between the left and right vertical wall portions 22 to fill the space portion 33 between the base portion 21 and the masking member 30*i* (see FIG. 21). Each rising rib 29 shows substantially a smooth triangle shape in which the length dimension of the rising rib 29 gradually decreases as it gets further away from the base portion 21 in viewing of a cross-section perpendicular to the width direction of the fastener member 20*b*. The rising rib 29 is also arranged in a position between the engaging elements 23 adjacent in the length direction. In this example 4, in particular, each rising rib 29 is arranged at the middle portion of the adjacent engaging elements 23 in the length direction.

Additionally, at both left and right sides of each engaging element 23 forming the engaging element row 26 of the middle portion in width direction, the rising ribs 29 are formed along the width direction. In this case, the rising ribs 29 that are provided on each of the left and right sides of the engaging element 23 and the engaging element 23 are formed away from each other by thin slits. Additionally, the thin slit is also formed between the reinforcing rib 22*b* and the rising rib 29.

Furthermore, in the Embodiment 4, the rising ribs 29 are also formed along the width direction on both left and right sides of each of the engaging elements forming the left and right engaging element rows 26. In other words, the rising ribs 29 are provided between the left engaging element row 26 and the right engaging element row 26, and the rising ribs 29 are provided one by one on the far-left side of the left engaging element row 26 and the far-right side of the right engaging element row 26. Additionally, the thin slit is formed between the engaging element 23 and the rising rib 29. Here, the slit provided between the engaging element 23 and the rising rib 29 is formed thin enough to prevent the foam resin from intruding in foam-molding of the cushion body.

Note that, the rising rib 29 provided along the width direction may be divided into several numbers by the slits, also may be continuously formed along the width direction. In the Embodiment 4, the number of slits formed in the rising rib 29 of the width direction is not particularly limited, and a position in which the slit is provided is also not limited. Additionally, the rising rib 29 of the Embodiment 4 is formed away from the engaging element 23 as described above, but the rising rib 29 may also be formed to directly connect the engagement element 23.

The rising rib 29 is preferably formed to have a height dimension bigger than a thickness (a height dimension from the upper surface to the lower surface of the base portion 21) of the base portion 21. Thus, the space portion 33 between the base portion 21 and the masking member 30*i* can be made effectively narrow by the rising ribs 29.

Additionally, the height dimension of the rising rib 29 is preferably smaller than that of the engaging element 23 from the upper surface of the base portion 21. Thus, a plurality of the loops of the loop member can easily enter between the engaging head portions of the engaging elements 23 adjacent in the length direction. Furthermore, the entered loop can be guided toward the engagement head portion of the engagement element 23 by the rising rib 29. As a result, the loop can be made to engage with the engaging element 23 easier.

The masking member 30*i* of the Embodiment 4 is provided between the left and right vertical wall portions 22 with respect to the fastener member 20*b*. This masking member 30*i* also wraps the reinforcing rib 22*b*, which is located inside of the vertical wall portion 22, and is formed to contact the vertical wall body 22*a* of the vertical wall portion 22. The masking top surface of the masking member 31*i* is formed flat and placed at a lower position than the upper surface of the vertical wall body 22*a* of the vertical wall portion 22 with respect to the height direction.

Two recessed channel portions 31*i* are provided on the masking back surface of the masking member 30*i* corresponding to positions of the left engaging element row 26 and the right engaging element row 26, respectively. Additionally, two thin portions 35*i* are provided on the masking member 30*i* by such channel portions 31*i*. The height dimension h of the thin portion 35*i* from the masking back surface to the masking top surface is smaller than that of the engaging element 23. For this reason, the engaging elements 23 of the left and right engaging element rows 26 become peeling engaging elements that is shallowly embedded in the masking member 30*i*. Whereas, the engaging elements 23 of the engaging element row 26 of the middle portion become anchoring engaging elements of which the whole engaging head portions and a part of the standing portions are embedded in the masking member 30*i*.

The masking member 30*i* of the Embodiment 4 is formed at the middle portion in the width direction so that the masking back surface contacts the rising rib 29, or so that a part of the rising rib 29 is embedded in the masking member 30*i*. This enables the space portion 33 between the base portion 21 and the masking member 30*i* to be effectively small.

Additionally, the masking member 30*i* is provided so that the left and right side edge portions of said masking member 30*i* and the rising ribs 29 that are arranged on the leftmost side and the rightmost side in the width direction, are apart from each other. This enables the masking member 30*i* to be easily peeled off from the fastener member 20*b*. Note that, in the Embodiment 4, the middle portion of the masking back surface in the width direction may be apart from the rising rib 29. Furthermore, the left and right side edge portions of the masking back surface may be formed to contact the rising ribs 29 or so that a part of the rising rib 29 is embedded in the masking member 30*i*.

The surface fastener 13 of the Embodiment 4 described above can be manufactured by the first molding apparatus 50 shown in FIG. 5, the second molding apparatus 60 shown in FIG. 6 and the cutting apparatus (not shown) that is disposed on the downstream side of the second molding apparatus 60. Note that, in the present invention, a method for manufacturing the surface fastener 13 of the Embodiment 4 is not limited.

According to the surface fastener 13 of the Embodiment 4, by providing a plurality of the rising ribs 29 to fill the space portion 33 on the upper surface of the base portion 21 of the fastener member 20*b*, a size (the height dimension) of the space portion 33 between the base portion 21 and the masking member 30*i* is made small. For this reason, in foam-molding of the cushion body, even if the foam resin intrudes the inside between the left and right vertical wall portions 22 from the thin gap (valley portion) disposed between the vertical wall bodies 22a of the left and right vertical wall portions 22, or even if the foam resin intrudes the inside of the length direction from the front end portion and the rear end portion of the surface fastener 13, the intruded foam resin can be effectively suppressed or prevented from expanding to the space portion 33 between the base portion 21 and the masking member 30i by a plurality of the rising ribs 29. This makes it difficult for the engagement area 25 to be contaminated by the foam resin.

Additionally, in the surface fastener 13 of the Embodiment 4, by providing a plurality of the rising ribs 29, the maximum height dimension between the masking back surface and the masking top surface in the masking member 30i does not have to be made large in order to make the space portion 33 smaller. For this reason, the anchoring engaging element can be shallowly embedded in the masking member 30i.

As a result, the engaging elements 23 of the fastener member 20b receive less damage from the synthetic resin for masking when the synthetic resin for masking of the masking member 30i is attached to the fastener member 20b, thus, it is less likely to cause a deformation and damage of the engaging elements 23 in manufacturing the surface fastener 13. Additionally, after the foam-molding of the cushion body, the masking member 30i can be easily peeled off from the fastener member 20b, and thus, it is less likely to cause a deformation and damage of the engaging elements 23 due to peeling off the masking member 30i. Therefore, the fastener member 20b, from which the masking member 30i is peeled off, can stably obtain the engaging strength to the loop member.

Furthermore, in such surface fastener 13 of the Embodiment 4 in which a plurality of the rising ribs 29 are provided on the base portion 21, it is possible to respectively change the height dimension of the rising rib 29 and the maximum height dimension of the masking member 30i between the masking back surface and the masking top surface corresponding with each other according to such as usage of said surface fastener 13.

In the present invention, for example, the surface fastener can be formed to have a form in which the maximum height dimension of the masking member described above is made smaller, as well as the height dimension of the rising rib is made larger compared to the surface fastener 13 of the Embodiment 4 described above. In such surface fastener, the space portion between the base portion and the masking member can also be made small, and this also makes it difficult for the engaging area to be contaminated by the foam resin, as the surface fastener 13 of the Embodiment 4 described above. Furthermore, a depth at which the anchor engaging element is embedded in the masking member can be made shallower. This enables the masking member to be easily peeled off from the fastener member, and the engaging element is less likely to be deformed or damaged.

Consequently, a plurality of the rising ribs 29 provided on the base portion 21 as the Embodiment 4 enable a size of the rising rib and the masking member to be changed freely. For this reason, a degree of freedom in designing of the surface fastener is greatly increased without losing the effect to suppress or prevent from contaminating the engaging area by foam resin.

Note that, as long as the rising rib 29 of the Embodiment 4 is integrally formed to bulge upward from the base portion 24, but a shape and position to be provided of the rising rib 29 are not particularly limited. The rising rib, for example, can be formed to show not only substantially a triangle as the Embodiment 4 but also other shapes, such as a trapezoid shape or a shape elongated wall extending upward, in viewing of a cross-section perpendicular to the width direction of the fastener member.

Additionally, the rising rib 29 of the Embodiment 4 is regularly formed along the width direction at a position between the adjacent engaging elements 23 in the length direction, but the rising rib 29, for example, can be also formed along a direction inclined to the width direction or the length direction, or a plurality of rising ribs can also be formed randomly.

Furthermore, the rising rib 29 provided on the fastener member 20b of the Embodiment 4 can also be provided on the previously described fastener member 20, 20a of the Embodiments 1 to 3.

Note that, in the surface fasteners according to each Embodiment and each modified example of the present invention described above, each of the masking top surfaces of the masking members is parallel to the longitudinal direction and the width direction, and is formed on a flat surface. In the present invention, however, the masking top surface of the masking member, for example, may be formed on a curved surface that is curved concavely or convexly in a predetermined direction in the width direction or some other directions. Alternatively, the masking top surface may be formed on a wavy surface that rises and falls vertically along a predetermined direction such as length direction, or may be formed on a random wavy surface that rises and falls vertically. Furthermore, a plurality of recessed channel portions along the length direction or the width direction, and/or a plurality of depressed portions that are partially recessed, may be provided on the masking top surface of the masking member.

Additionally, in the surface fasteners of each Embodiment and each modified example described above, a plurality of the engaging elements forming the engaging area are overall arranged regularly in a staggered pattern, and form a plurality of the engaging element rows aligned along the length direction. In the present invention, however, a density of forming or a forming pattern of the engagement elements forming the engaging area is not particularly limited. A forming pattern of a plurality of the engagement elements, for example, are not limited to a staggered arrangement, and a plurality of the engaging elements may be arranged regularly aligned not only in the length direction but also in the length and the width direction in a latticed pattern. A plurality of the engaging elements may also be randomly arranged in the engaging area.

Furthermore, the number of engaging element rows formed along the length direction on one fastener member is preferably two or more rows. In this case, the number of engaging element rows formed along the length direction is preferably three or more rows and six or less rows in the width direction, in terms of a holding strength and stability in holding the masking member on the fastener member, and in terms of easiness of peeling off in peeling off the masking member from the fastener member.

REFERENCE SIGNS LIST

10 Surface fastener
10a-10h Surface fastener
11,12,13 Surface fastener
15 Fastener engaging portion
16 Connecting portion
20, 20a Fastener member
20b Fastener member 21 Base portion
22 Vertical wall portion
22a Vertical wall body
22b Reinforcing rib
23 Engaging element
23a Anchoring engaging element
23b Peeling engaging element
24 Ear portion
24a Ear body portion
24b Protruding wall portion
25 Engaging area
26 Engaging element row
27 Separating slit
28 Monofilament
29 Rising rib
30,30a Masking member
30b, 30c Masking member
30d, 30e Masking member
30f, 30g Masking member
30i Masking member
31,31b Channel portion
31e, 31f Channel portion
31i Channel portion
32 Wall contacting portion
33 Space portion
34 Bending portion
35,35c Thin portion
35i Thin portion
40 Masking member
41 Masking body portion
42 Monofilament
43 Fixing rib
44 Bending portion
45 Channel portion
46 Base contacting portion
47 Space portion
48 Exposing portion
49 Thin portion
50 First molding apparatus
51 Die wheel
52 First nozzle portion
52a Flow path portion
52b Wheel facing surface
52c Resin supplying port
53 Pickup roller
60 Second molding apparatus
61a Left attaching roller
61b Right attaching roller
62 Second nozzle portion
63 Molding roller (Masking roller)
64 Conveying roller
70 Second molding apparatus
71a Left attaching roller
71b Right attaching roller
72 Second nozzle portion
73 Molding roller
74 Conveying roller
75 Guiding roller
h Height dimension from channel bottom portion of masking back surface to masking top surface

The invention claimed is:

1. A surface fastener including:
a fastener member made of a synthetic resin and a masking member detachably held by the fastener member, wherein
the fastener member includes an elongated and plate-shaped base portion having a first surface and a second surface, and a plurality of engaging elements protruding from the first surface of the base portion,
the masking member covers an engaging area, in which the plurality of the engaging elements of the fastener member are included on the first surface of the base portion,
at least a part of at least one of the engaging elements is embedded in the masking member, and
a space portion is provided between the base portion and the masking member in at least a part of the engaging area,
the masking member includes a masking back surface facing the first surface of the base portion,
a whole of the masking back surface is away from the base portion via the space portion, and
a recessed channel portion extending in a direction away from the base portion is provided on the masking back surface.

2. The surface fastener according to claim 1,
wherein the fastener member includes a plurality of engaging element rows in which a plurality of the engaging elements are formed along a length direction of the base portion in each engaging element row, and
a plurality of the engaging elements disposed in one engaging element row are embedded in the masking member at the same depth.

3. The surface fastener according to claim 1,
wherein the masking member is long, and a cross-section of the masking member or a body portion of the masking member perpendicular to a length direction has the same shape in the whole of the masking member in the length direction.

4. The surface fastener according to claim 1,
wherein the masking member includes a masking top surface disposed on an opposite side of the masking back surface,
the masking member includes a thin portion, and
a height dimension of the thin portion from the masking back surface to the masking top surface is smaller than a height dimension of the engaging elements from the first surface of the base portion.

5. The surface fastener according to claim 1,
wherein
the masking member includes a plurality of recessed channel portions provided on the masking back surface and extending in a direction away from the first surface of the base portion, and
each of the recessed channel portions is formed so that a height dimension from the first surface of the base portion to a channel bottom portion of the recessed channel portion is smaller than a maximum value of a height dimension of the engaging elements from the first surface of the base portion.

6. The surface fastener according to claim 1,
wherein each of the engaging elements includes a standing portion that stands up from the base portion and an engaging head portion extending from a tip end portion of the standing portion,
the plurality of the engaging elements comprised in the engaging area include an anchoring engaging element, at least a part of the engaging head portion of which is embedded in the masking member, and a peeling engaging element, which is embedded in the masking member at smaller depth than the anchoring engaging element or which is not embedded in the masking member.

7. The surface fastener according to claim 6,
wherein the whole engaging head portion and at least a part of the standing portion of the anchoring engaging element are embedded in the masking member.

8. The surface fastener according to claim 1,
wherein a plurality of the engaging elements comprised in the engaging area are embedded in the masking member at a constant depth.

9. The surface fastener according to claim 1,
wherein the fastener member includes left and right vertical wall portions provided along a length direction on the base portion,
a plurality of the engagement elements and the masking member are arranged between the left and right vertical wall portions,
monofilaments containing magnetic particles are fixed on the left and right vertical wall portions, or magnetic particles are contained in the left and right vertical wall portions.

10. The surface fastener according to claim 9,
wherein the masking member has a masking top surface disposed on an opposite side of the masking back surface,
top end surfaces of the left and right vertical wall portions are located farther away from the base portion than the masking top surface of the masking member in a height direction of the surface fastener.

11. The surface fastener according to claim 1,
wherein a monofilament containing magnetic particles is arranged or magnetic particles are contained in the masking member along a length direction of the masking member.

12. The surface fastener according to claim 1,
wherein the surface fastener includes a plurality of fastener engaging portions disposed along a length direction and a flexible connecting portion that connects the fastener engaging portions adjacent to each other in the length direction,
the connecting portion is formed by the fastener member and the masking member.

13. The surface fastener according to claim 1,
wherein the fastener member includes a rib protruding from the first surface of the base portion and fills the space portion.

14. The surface fastener according to claim 1,
wherein a bending portion formed by bending the masking member in a direction away from the base portion is provided in at least one end portion of the masking member in a length direction.

15. The surface fastener according to claim 1,
wherein a slit that separates a part of the base portion is provided at at least one end portion of the base portion in a length direction.

* * * * *

UNITED STATES PATENT AND TRADEMARK OFFICE
CERTIFICATE OF CORRECTION

| | | |
|---|---|---|
| PATENT NO. | : 12,129,885 B2 | Page 1 of 1 |
| APPLICATION NO. | : 17/636262 | |
| DATED | : October 29, 2024 | |
| INVENTOR(S) | : Zhiyu Ren et al. | |

It is certified that error appears in the above-identified patent and that said Letters Patent is hereby corrected as shown below:

On the Title Page

In Column 1, Item (30) under "Foreign Application Priority Data", Line 1, delete "(WO)" and insert -- (JP) --.

In the Specification

In Column 35, Line 16, delete "30,30a" and insert -- 30, 30a --.

In Column 35, Line 21, delete "31,31b" and insert -- 31, 31b --.

In Column 35, Line 27, delete "35,35c" and insert -- 35, 35c --.

Signed and Sealed this
Tenth Day of December, 2024

Katherine Kelly Vidal
*Director of the United States Patent and Trademark Office*